(12) United States Patent
Tilton

(10) Patent No.: US 7,697,759 B2
(45) Date of Patent: Apr. 13, 2010

(54) SPLIT-REMERGE METHOD FOR ELIMINATING PROCESSING WINDOW ARTIFACTS IN RECURSIVE HIERARCHICAL SEGMENTATION

(75) Inventor: James C. Tilton, Bowie, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 1138 days.

(21) Appl. No.: 11/251,530

(22) Filed: Sep. 30, 2005

(65) Prior Publication Data

US 2006/0050984 A1  Mar. 9, 2006

Related U.S. Application Data

(63) Continuation-in-part of application No. 10/845,419, filed on May 11, 2004, now abandoned.

(51) Int. Cl.
   G06K 9/34 (2006.01)
(52) U.S. Cl. ..................................... 382/180
(58) Field of Classification Search .................. 382/180
   See application file for complete search history.

(56) References Cited

U.S. PATENT DOCUMENTS

| | | | | |
|---|---|---|---|---|
| 4,791,486 | A * | 12/1988 | Spriggs et al. | 375/240.08 |
| 5,995,668 | A * | 11/1999 | Corset et al. | 382/233 |
| 6,895,115 | B2 * | 5/2005 | Tilton | 382/180 |
| 6,993,180 | B2 * | 1/2006 | Sun et al. | 382/165 |
| 7,068,809 | B2 * | 6/2006 | Stach | 382/100 |
| 7,079,076 | B2 * | 7/2006 | Montheard et al. | 342/357.15 |
| 7,305,129 | B2 * | 12/2007 | Chellapilla et al. | 382/174 |
| 7,346,205 | B2 * | 3/2008 | Walker, Jr. | 382/133 |
| 2002/0067849 | A1 * | 6/2002 | Klassen et al. | 382/162 |
| 2002/0131499 | A1 * | 9/2002 | De Haan et al. | 375/240.12 |
| 2003/0081833 | A1 * | 5/2003 | Tilton | 382/173 |
| 2003/0185452 | A1 * | 10/2003 | Wang et al. | 382/236 |

OTHER PUBLICATIONS

Yang et al. "SAR Sea Ice Image Segmentation Based on Edge Preserving Watersheds" Canadian Conference on Computer and Robot Vision, pp. 1-6.*
Yu et al. "Polarimetric SAR Image Segmentation Using Texture and Statistical Analysis" IEEE, 2000—pp. 677-680.*
R.L. Kettig et al.,"Automatic Boundary and Sample Classification of Remotely Sensed Multispectral Data,"LARS,1973, pp. 4-6, pp. II-2-II-3, Indiana, USA.
B.R. Frieden, "Image Enhancement and Restoration", Picture Processing and Digital Filtering, 1975, pp. 228-231, Springer-Verlag Berlin Heidelberg, New York, USA.
R.L. Kettig et al.,"Computer Classification of Remotely Sensed Multispectral Image Data By Extraction and Classification of Homogeneous Objects",LARS,1975,pp. 38-49,Indiana,USA.

(Continued)

Primary Examiner—Bhavesh M Mehta
Assistant Examiner—Mia M Thomas
(74) Attorney, Agent, or Firm—Christopher O. Edwards

(57) ABSTRACT

A method, computer readable storage, and apparatus for implementing recursive segmentation of data with spatial characteristics into regions including splitting-remerging of pixels with contagious region designations and a user controlled parameter for providing a preference for merging adjacent regions to eliminate window artifacts.

19 Claims, 18 Drawing Sheets

OTHER PUBLICATIONS

James C. Tilton, "Segmentation of Remotely Sensed Data Using Parallel Region Growing", Digest of 1983 Int'l. Geoscience and Remote Sensing Symposium, 1983, pp. 9.1-9.6, USA.

James C. Tilton, "Image Segmentation By Iterative Parallel Region Growing With Applications To Data Compression And Image Analysis", Proceedings of the 2nd Symposium on the Frontiers of Massively Parallel Computing, Oct. 10-12, 1988, pp. 357-360, Fairfax, Virginia, USA.

J.-M.Beaulieu et al.,"Hierarchy in Picture Segmentation:A Stepwise Optimization Approach,"IEEE Trans. on Pattern Analysis and Machine Intelligence,1989,pp. 150-163,vol. 11,No. 2.

Sanghoon Lee,"An Unsupervised Hierarchical Clustering Image Segmentation And An Adaptive Image Reconstruction System For Remote Sensing",Univ. of Texas,1990,pp. i-xv,1-163,USA.

James C. Tilton, "Experiences using TAE-PLUS Command Language for an Image Segmentation Program Interface",Proceedings of the TAE Ninth Users' Conference,1991,pp. 297-312,USA.

Andrea Baraldi et al.,"Single Linkage Region Growing Algorithms Based on the Vector Degree of Match",IEEE Transactions on Geoscience and Remote Sensing,1996,pp. 137-148,vol. 34.

Kostas Haris et al., "Hybrid Image Segmentation Using Watersheds and Fast Region Merging", IEEE Trans. on Image Processing, Dec. 1998, pp. 1684-1699, vol. 7, No. 12.

Sanghoon Lee et al., Efficient Multi-stage System for Unsupervised Classification and Its Application of KOMPSAT-I Imagery, Proceedings of the 2000 International Geoscience and Remote Sensing Symposium, Jul. 24-28, 2000, pp. 2173-2175, Honolulu, HI.

J.-M. Beaulieu, "Utilisation of contour criteria in micro-segmentation of SAR images", International Journal of Remote Sensing,Sep. 10, 2004, pp. 3497-3512,vol. 25,No. 17.

G.W. Snedecor et al., "Statistical Methods", 1967, pp. 114-116, The Iowa State University Press, Ames, Iowa.

Lothar Sachs, "Applied Statistics, A Handbook of Techniques", Springer Series in Statistics, 1982, pp. 271-275, Springer-Verlag, New York, USA.

* cited by examiner

SPLIT-REMERGE METHOD FOR ELIMINATING PROCESSING WINDOW ARTIFACTS IN RECURSIVE HIERARCHICAL SEGMENTATION

CROSS-REFERENCE TO RELATED APPLICATIONS

The present application is a continuation in part of U.S. Ser. No. 10/845,419 filed May 11, 2004 now abandoned, and which is incorporated herein by reference.

ORIGIN OF THE INVENTION

The invention described herein was made by an employee of the United States Government, and may be manufactured and used by and for the Government or for governmental purposes without the payment of any royalties thereon or therefor.

FIELD OF THE INVENTION

The present invention relates to a method for eliminating processing window artifacts that may occur when partitioning spatially related data into sections or regions for processing. More particularly, the present invention describes a split-remerge method for identifying and splitting possible artifacts of data and then merging that data with the most appropriate region.

BACKGROUND OF THE INVENTION

Segmentation, the partitioning of data into related sections or regions, is a key first step in a number of approaches to data analysis and compression. In data analysis, the group of data points contained in each region provides a statistical sampling of data values for more reliable labeling based on data feature values. In data compression, the regions form a basis for compact representation of the data. The quality of the prerequisite data segmentation is a key factor in determining the level of performance of most of these data analysis and compression approaches.

Most segmentation approaches can be placed in one of three categories:
  (i) characteristic feature thresholding or clustering,
  (ii) boundary detection, or
  (iii) region growing.

Characteristic feature thresholding or clustering does not exploit spatial information, and thus ignores information that could be used to enhance the segmentation results. While boundary detection does exploit spatial information by examining local edges found throughout the data, it does not necessarily produce closed connected region boundaries. For simple noise-free data, detection of edges usually results in straightforward region boundary delineation. However, edge detection on noisy, complex data often produces missing edges and extra edges that cause the detected boundaries to not necessarily form a set of close connected curves that surround connected regions. Region growing approaches to segmentation are preferred because region growing exploits spatial information and guarantees the formation of closed, connected regions.

Segmentation is often used in the analysis of imagery data. The techniques described can be applied to image data and to any other data that has spatial characteristics. A data set has spatial characteristics if it can be represented on an n-dimensional grid, and when so represented, data points that are nearer to each other in the grid generally have a higher statistical correlation to each other than data points further away. For remotely sensed images of the earth, an example of a segmentation would be a labeled map that divides the image into areas covered by distinct earth surface covers such as water, snow, types of natural vegetation, types of rock formations, types of agricultural crops and types of other man created development. In unsupervised image segmentation, the labeled map may consist of generic labels such as region 1, region 2, etc., which may be converted to meaningful labels by a post-segmentation analysis. In image analysis, the group of image points contained in each region provides a good statistical sampling of image values for more reliable labeling based on region mean feature values. In addition, the region shape or texture can be analyzed for additional clues to the appropriate labeling of the region.

A segmentation hierarchy is a set of several segmentations of the same data at different levels of detail in which the segmentations at coarser levels of detail can be produced from simple merges of regions at finer levels of detail. This is useful for applications that require different levels of segmentation detail depending on the particular data objects segmented. A unique feature of a segmentation hierarchy that distinguishes it from most other multilevel representations is that the segment or region boundaries are maintained at the finest data granularity for all levels of the segmentation hierarchy.

In a segmentation hierarchy, an object of interest may be represented by multiple segments in finer levels of detail in the segmentation hierarchy, and may be merged into an encompassing region at coarser levels of detail in the segmentation hierarchy. If the segmentation hierarchy has sufficient resolution, the object of interest will be represented as a single region segment at some intermediate level of segmentation detail. The segmentation hierarchy may be analyzed to identify the hierarchical level at which the object of interest is represented by a single region segment. The object may then be identified through its spectral and region characteristics, such as shape and texture. Additional clues for object identification may be obtained from the behavior of the segmentations at the hierarchical segmentation levels above and below the level at which the object of interest is represented by a single region.

In U.S. Pat. No. 6,895,115, which is incorporated herein by reference, a segmentation approach is described that automatically provides hierarchical segmentations for data at several levels of detail. This approach, called HSEG, is a hybrid of region growing and spectral clustering that produces a hierarchical set of segmentations based on detected natural convergence points. Because of the inclusion of spectral clustering, the HSEG algorithm is very computationally intensive, and cannot be performed in less than a day on moderately sized data sets, even with the most powerful single processor computer currently available. The processing time problem was addressed through a recursive formulation of HSEG, called RHSEG. RHSEG can process moderately sized data sets in a reasonable amount of time on currently available PCs and workstations. Larger data sets required the use of a parallel implementation of RHSEG on a parallel computing system.

However, a problem with the RHSEG algorithm and certain other data processing algorithms that similarly subdivide and subsequently recombine data during processing instant processing artifacts can be introduced by the division and recombination of the data. An example of these processing artifacts can be demonstrated on an 896×896 pixel section of Landsat ETM+ (Enhanced Thematic Mapper) data displayed in FIG. 1. This image was obtained on May 28, 1999 over the southwestern coast of the eastern shore of Maryland. The six non-thermal bands were used in the segmentation tests.

FIG. 2 displays the segmentation of this image into 96 regions as produced by the basic version of RHSEG. Straight-line processing window artifacts from the recursive quartering of the image data are quite evident in sub-regions of the Chesapeake Bay 1,2 and on land in the right center part of the image 3. These straight or blocked lines have no relationship to the data in the image itself, but arose from the recursive subdivision and recombination process. Processing artifacts may be very noticeable as lines, or merely a few mislabeled pixels.

In the prior art, a "contagious clusters" or "contagious regions" concept has been used to attempt to reduce or eliminate the processing window artifacts. The contagious regions concept can be described as follows:

Flag any region that touches a boundary between processing windows and suppress any merging between flagged regions and any other region.

If a non-flagged or "non-contagious" region attempts to merge with a flagged or "contagious" region, the previously non-flagged region becomes flagged or "contagious."

Thus, the contagious property of the flagged regions is literally contagious. Unfortunately, when the contagious regions concept is applied to the RHSEG algorithm, and when more than two or three levels of recursion are utilized, the RHSEG algorithm is only able to effectively process the data. The RHSEG algorithm effectively stalls because so many regions become contagious that the number of regions in the processing window becomes so large that the processing time required is not sufficiently advantageous over a non-segmented image processing approach.

Indirect mechanisms, however, also exist. For example, increasing the number of regions at which convergence is achieved at intermediate levels of the recursive processing may indirectly cause a reduction in processing window artifacts. A larger value may delay some region merging decisions that would have involved regions on the borders of processing windows to occur after those regions are no longer on the borders of processing windows. This indirect method, however, is inefficient because processing time increases with larger values of the number of regions needed to achieve convergence. Further, processing artifacts are not always eliminated via this method. Other approaches to reducing window artifacts may manipulate other parameters in the recursive hierarchical segmentation processing, but also increase processing time and resources, such that the approaches become impractical for large sets of data.

Indeed, all previously developed techniques for splitting inappropriately merged pixels or processing image data in a fashion to avoid creating window artifacts unacceptably increase the processing time required. Thus, in prior application Ser. No. 10/845,419, a switch-pixels method of addressing window artifacts was disclosed, however, this technique had no mechanism for giving priority to spatial adjacency in switching pixels from one region to another.

SUMMARY OF THE INVENTION

Accordingly, it is an object of the present invention to implement a split-remerge process for eliminating processing window artifacts in recursive hierarchical segmentation of data. The foregoing object of the invention is achieved by identifying candidate pixels or data points or regions of points that have been inappropriately merged, identifying a candidate region with which those data points or sets might be more appropriately merged and then evaluating the best merger candidate giving due weight to spatial distance between the flagged data and the candidate region for merger. While initially designed for the analysis of single-band, multispectral or hyperspectral remotely sensed imagery data for earth science applications, the software innovation also has applications to image data compression of image data archives, data mining (searching for particular shapes of objects with certain feature vector characteristics), and data fusion (based on matching region features between data sets from different times and/or different sensors). Applications outside of remote sensing are the analysis of imagery for medical applications and for nondestructive evaluation in manufacturing quality control. A possible military application is land mine detection.

BRIEF DESCRIPTION OF THE DRAWINGS

These and other advantages of the invention will be more fully appreciated from the following description of preferred embodiments taken in conjunction with the accompanying drawings, of which.

DETAILED DESCRIPTION OF THE INVENTION

Figure 1:
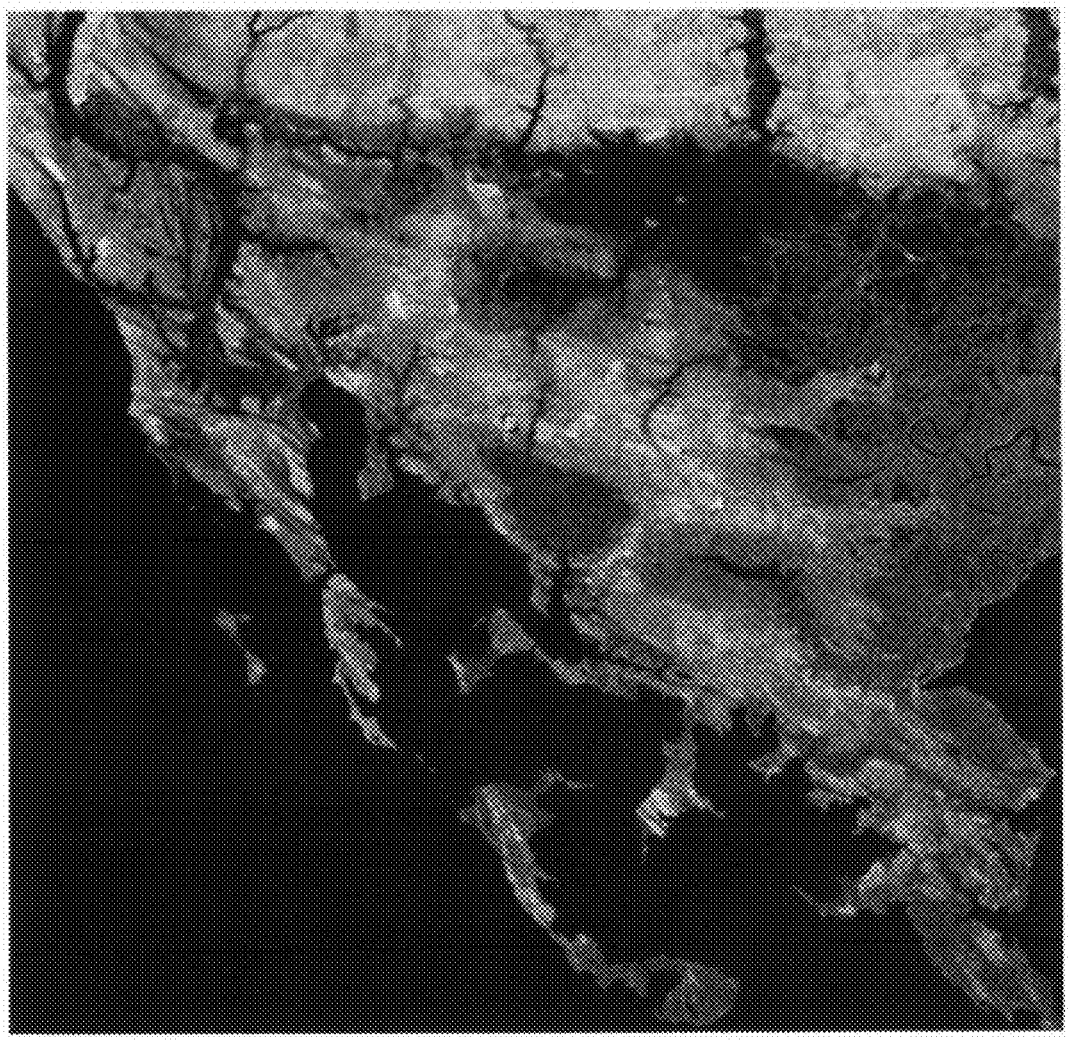
FIG. 1 is an example of a satellite image before segmentation.

Most prior techniques for region growing data segmentation are based on the classic definition of 2-spatial dimension image segmentation:

Let X be a 2-dimensional array representing an image. A segmentation of X can be defined as a partition of X into disjoint subsets $X_1, X_2, \ldots, X_N$, such that 1) $\bigcup_{i=1}^{N} X_i = X$ 2) $X_i$, $i = 1, 2, \ldots, N$ is connected.

3) $P(X_i)$ = TRUE for $i = 1, 2, \ldots, N$, and

4) $P(X_i \cup X_j)$ = FALSE for $i \neq j$, where $X_i$ and $X_j$ are adjacent.

$P(X_i)$ is a logical predicate that assigns the value TRUE or FALSE to $X_i$, depending on the image data values in $X_i$.

For example, a logical predicate based on the vector 2-norm is:

$$P(X_i) = \left( \frac{1}{n_i} \sum_{x_j \in X_i} \|x_j - \overline{x}_i\|_2 \leq T \right), \quad (1)$$

where $n_i$ is the number of pixels in region i, $\overline{x}_i$ is the mean vector for region i, and T is a threshold.

These conditions might be summarized as follows: The first condition requires that every picture element (pixel) must be in a region. The second condition requires that each region must be connected, i.e. composed of contiguous image pixels. The third condition determines what kind of properties each region must satisfy, i.e. what properties the image pixels must satisfy to be considered similar enough to be in the same region. The fourth condition specifies that, in the final segmentation result, any merging of any adjacent regions would violate the third condition. If classical image segmentation is not implemented recursively, it will not be subject to problems with processing window artifacts. A window is one of the data subsections defined by the recursive subdivision and subsequent recombination of the data in the context of "a processing window." Processing Window Artifacts are sub-optimal region assignments for data elements caused by the structure of the recursive subdivision and subsequent recombination of the data in the context of a recursive implementation of a segmentation algorithm. A recursive implementation of a segmentation algorithm can also be referred to as a recursive segmentation algorithm. A recursive implementation of a segmentation algorithm is defined as follows: (a) recursively divide the data into subsections until each subsection consists of no more than a predetermined maximum number of data elements; (b) perform the segmentation algorithm on each data subsection such that no more than a predetermined number of regions is reached. Then return the segmentation result and maximum merging threshold to the calling recursive level. (c) After a return from a deeper level of recursion, initialize the segmentation algorithm with segmentation results from all the deeper levels of recursion, and perform the segmentation algorithm on the data subsection at the current level of recursion such that no more than a predetermined number of regions is reached. (d) After step (b) is completed for all data subsections from step (a), and after step (c) is completed for all recursive returns, continue the segmentation algorithm to completion on the entire data set.

A problem with the classic definition of image segmentation is that the segmentation so defined is not unique. The number, N, and shape of the partitions, $X_1, X_2, \ldots, X_N$, depend on the order in which the image pixels are processed. In addition, there is no concept of optimality contained in this definition of image segmentation. Under this classic definition, all partitions that satisfy the conditions represent equally good or valid segmentations of the image.

A less commonly used, more computationally intensive but often more accurate approach to 2-spatial dimension image segmentation is the Hierarchical Stepwise Optimization (HWSO) algorithm of Beaulieu and Goldberg. HSWO can be defined recursively as follows:

Let X be a 2-dimensional array representing an image and let $X_1, X_2, \ldots, X_{N-1}, X_N$ be a partition of X into N regions such that 1) $\bigcup_{i=1}^{N} X_i = X$ and 2) $X_i$, $i = 1, 2, \ldots, N$ is connected.

Let $G(X_i)$ be a function that assigns a cost to partition $X_i$, depending on the image data values in $X_i$. Reorder the partition $X_1, X_2, \ldots, X_{N-1}, X_N$ such that $G(X_{N-1} \cup X_N) \leq G(X_i \cup X_j)$ for all $i \neq j$ where $X_{N-1}$ and $X_N$ are adjacent and $X_i$ and $X_j$ are adjacent. The segmentation of X into N-1 regions is defined as the partition $X'_1, X'_2, \ldots, X'_{N-1}$ where $X'_i = X_i$ for $i=1, 2, \ldots, N-2$ and $X'_{N-1} = X_{N-1} \cup X_N$.

The initial partition may assign each image pixel to a separate region, in which case the initial value of N is the number of pixels in the image ($N_p$). Any other initial partition may be used, such as a partitioning of the image into n×n blocks, where $n^2 \ll N_p$.

For example, a cost function based on the vector 2-norm is:

$$G(X_i) = \left( \frac{1}{n_i} \sum_{x_j \in X_i} \|x_j - \overline{x}_i\|_2 \right), \quad (2)$$

where $n_i$ is the number of pixels in region i, and $\overline{x}_i$ is the mean vector for region i.

If HSWO segmentation is not implemented recursively, it will not be subject to problems with processing window artifacts.

Figure 7:
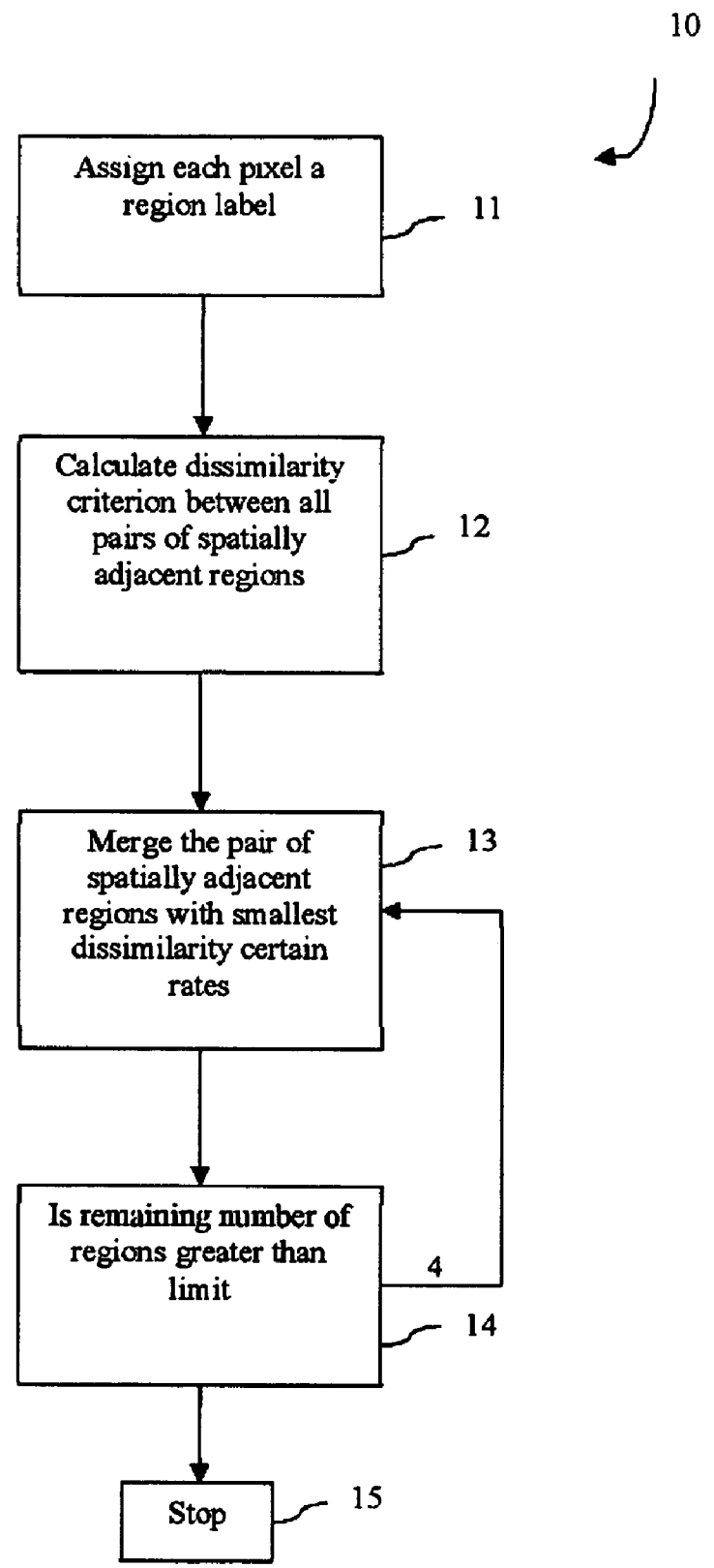
FIG. 7 is a flow chart illustrating the HSWO algorithm.

A description of the HSWO algorithm follows and is shown in FIG. 7:

HSWO Basic Algorithm Description 10:

1. Initialize the segmentation by assigning each image pixel a region label 11. If a pre-segmentation is provided, label each image pixel according to the pre-segmentation. Otherwise, label each image pixel as a separate region.

2. Calculate the dissimilarity criterion value between all pairs of spatially adjacent regions 12, find the pair of spatially adjacent regions with the smallest dissimilarity criterion value, and merge that pair of regions 13.

3. Stop 15 if no more merges are required. Otherwise 14, return to step 2.

Beaulieu and Goldberg did not specify a tie-breaking method for step 2, i.e., no procedure is specified for handling the case when more than one pair of regions was found to have the smallest dissimilarity criterion value. A suitable tie-breaking criterion is as follows: If more than one pair of regions has the smallest dissimilarity criterion, the merge involving the region with the largest region label is arbitrarily performed first. If this region with the largest region label also has the smallest dissimilarity criterion relative to more than one region, all of these regions are merged together (effectively, in parallel). This tie-breaking criteria is arbitrary, and is based on convenience of implementation. An additional arbitrary convention is that the region with the larger region label is merged into the region with the smaller region label (i.e., the smaller region label survives the merge).

Beaulieu and Goldberg show that the HSWO algorithm produces the globally optimal segmentation result if the statistics at all iterations are independent. Even though the statistics at all iterations will generally not be independent for natural images, the HSWO approach is still shown to produce excellent results. Beaulieu and Goldberg also point out that the sequence of partitions generated by this iterative approach reflect the hierarchical structure of the imagery data: the partitions obtained in the early iterations preserve the small details and objects in the image, while the partitions obtained in the latter iterations preserve only the most important components of the image. They further note that these hierarchical partitions may carry information that may help in identifying the objects in the imagery data.

Beaulieu and Goldberg developed a dissimilarity criterion (which they call a stepwise criterion) based on the piecewise approximation an image by constant value regions, with the value given by the mean value of the region. For the gray scale (single spectral band) images they considered, their stepwise merging criterion, $C_{i,j}$, is:

$$C_{i,j} = \frac{n_i n_j}{(n_i + n_j)} (\mu_i - \mu_j)^2. \quad (3)$$

While HSWO has advantages over the classical image segmentation approaches in terms of optimality, it runs into problems when applied to even moderately large data sets. This is because HSWO does not allow the merging of non-spatially connected regions. The large number of regions required by HSWO for a complete representation of the segmentation detail leads to processing inefficiencies in two different ways:

(i) If HSWO is implemented recursively (like basic RHSEG), this large number of regions limits min_nregions to be no less than chk_nregions/4, where chk_nregions is the number of regions required for complete representation, and min_nregions is the as defined in the basic RHSEG algorithm.

(ii) If a hierarchical segmentation result is desired, the computations must be computed for a much larger number of region growing iterations.

HSWO and HSEG without spectral clustering are impractical for even moderately sized image because of the number of regions required to represent a useful level of segmentation detail. The optional spectral clustering step in the HSEG algorithm is what makes practical use of the HSEG algorithm possible for even very large images, with the approximation of HSEG in the RHSEG recursive implementation. (A recursive implementation of HSEG is not useful without the spectral clustering step, due to the high value of min_nregions required for even moderately sized data sets.) This is similar to the multiple spectral band "square root of the band sum mean squared error" criterion used in HSEG and explained under the parameter dissim_crit below.

Figure 8A:
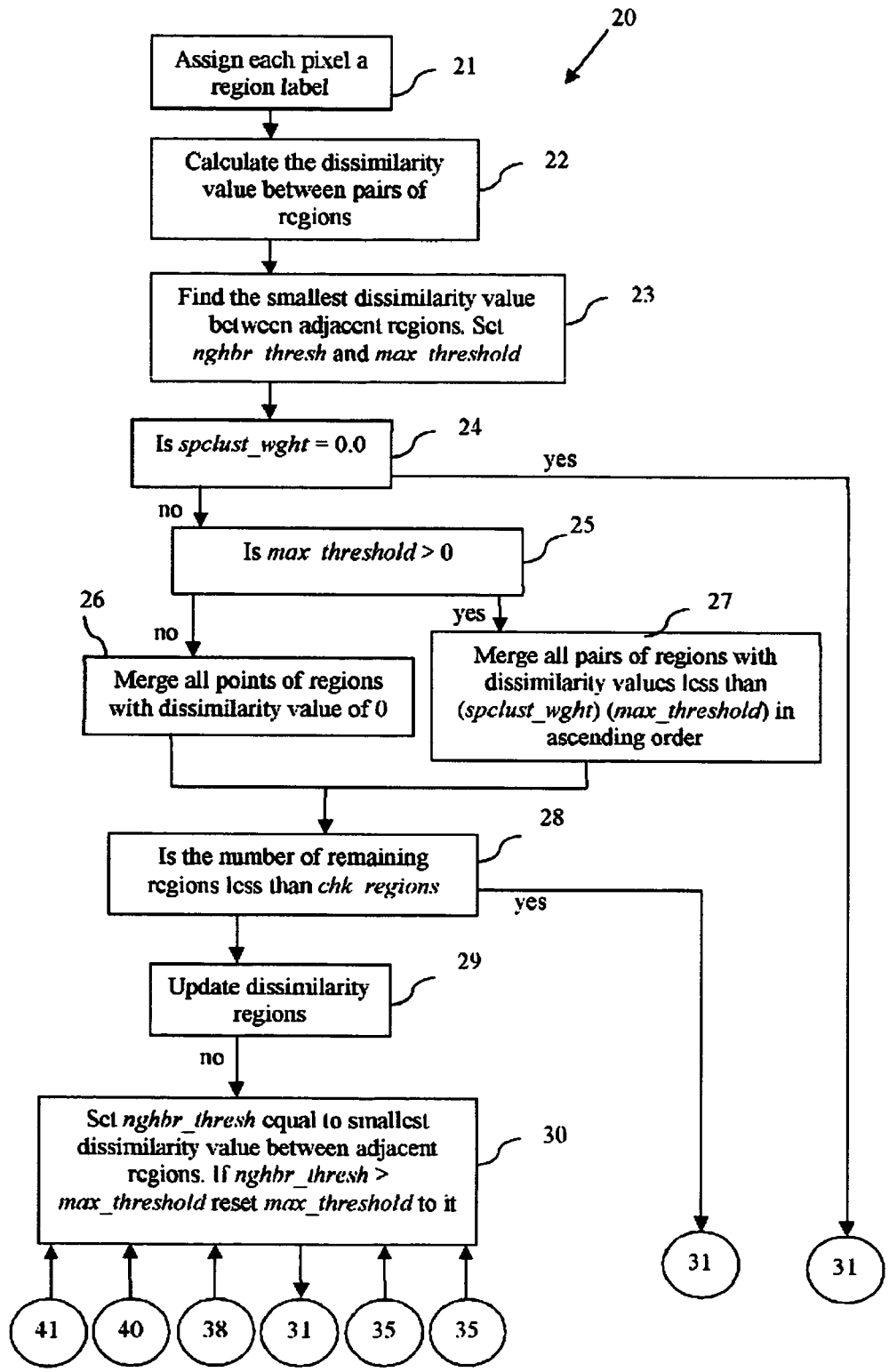
FIGS. 8A and 8B are a flow chart illustrating the HSEG algorithm.
Figure 8B:
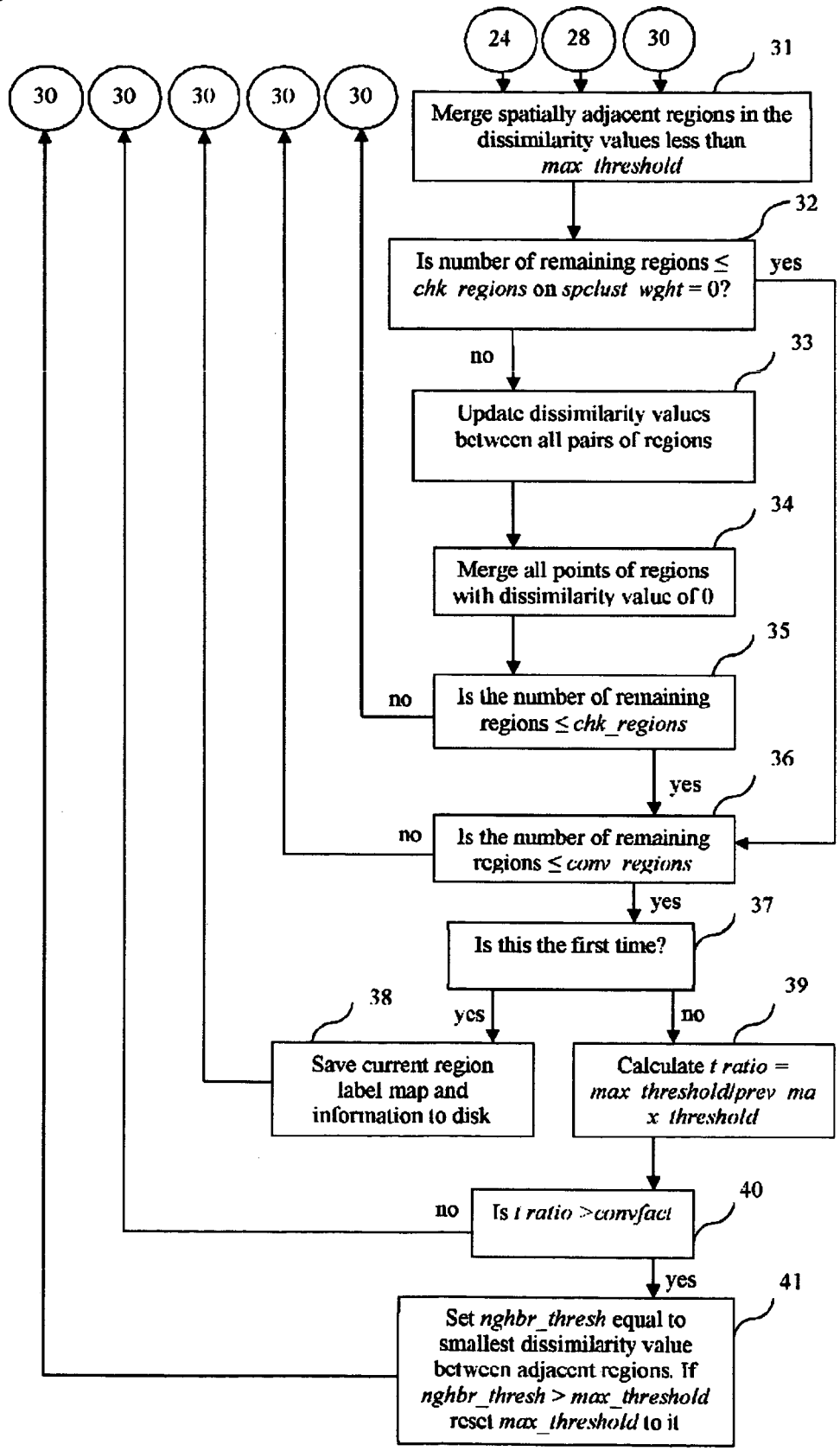

HSEG is an elaboration of HSWO in which an option for merging spatially non-adjacent regions is added along with a method for selecting a subset of segmentation results to form the segmentation hierarchy output 20 shown in FIGS. 8A and 8B. The variable spclust_wght is introduced to define the relative importance of spectral clustering versus region growing. When spclust_wght=0, only merges between spatially adjacent regions are permitted. When spclust_wght=1, other adjacent and non-adjacent regions are considered equally. Other italicized parameters mentioned are defined at the end of the specification.

HSEG Algorithm Description:

1. Give each image pixel a numeric region label 21. If a pre-segmentation is provided, label each image pixel according to the pre-segmentation. Otherwise, label each image pixel as a separate region.

2. Calculate the dissimilarity value, dissim_val, between all pairs of spatially adjacent regions 22. If spclust_wght>0.0, also calculate dissim_val between all pairs of spatially non-adjacent regions.

3. Find the smallest dissim_val between spatially adjacent pairs of regions 23 and set nghbr_thresh equal to it. Set prev_max_threshold=0.0 and max_threshold=nghbr_thresh.

4. If spclust_wght=0.0 24, go to step 7. Otherwise, if max_threshold=0.0 25, merge all pairs of regions (spatially adjacent or spatially non-adjacent) with dissim_val=0.0 26. If max_threshold>0.0, merge all pairs of regions (spatially adjacent or spatially non-adjacent) with dissim_val<spclust_wght*max_threshold in order from smallest dissim_val to largest dissim_val 27. Update the dissim_val's for spatially adjacent and non-adjacent regions between each merge as necessary. (Ties are resolved in the same manner used for HSWO.)

5. If the number of regions remaining is less than or equal to the preset value chk_nregions 28, go to step 11. Otherwise, update the dissim_val's between spatially adjacent pairs of regions as necessary 29.

6. Find the smallest dissim_val between spatially adjacent pairs of regions and set nghbr_thresh equal to it 30. If nghbr_thresh>max_threshold, set prev_max_threshold=max_threshold and then set max_threshold=nghbr_thresh.

7. Merge all pairs of spatially adjacent regions with dissim_val≦max_threshold in order from smallest dissim_ val to largest dissim_val 31. Update the dissim_val's for spatially adjacent regions between each merge as necessary. (Ties are resolved in the same manner used for HSWO.)

8. If the number of regions remaining is less than or equal to the preset value chk_nregions, go to step 11, or if spclust_wght=0.0 32, go to step 11. Otherwise, update the dissim_val's between all pairs of spatially adjacent and non-adjacent regions 33.

9. Merge all pairs of spatially adjacent or non-adjacent regions with dissim_val≦spclust_wght*max_threshold in order from smallest dissim_val to largest dissim_val. (For the most part, only spatially non-adjacent merges will occur.) 34. Update the dissim_val's for spatially adjacent and non-adjacent regions between each merge as necessary. (Ties are resolved in the same manner used for HSWO.)

10. If the number of regions remaining is less than or equal to chk_nregions 35, go to step 11. Otherwise, go to step 6.

11. If the number of regions remaining is less than or equal to conv_nregions 36, save the current region label map to disk along with associated region information and STOP. If this is the first time this step is executed 37, save the current region label map to disk along with associated region information 38, and go to step 6. Otherwise, calculate tratio=max_threshold/prev_max_threshold 39. (Since this instruction cannot be reached first time this step is executed, prev_max_threshold is guaranteed to be >0.0.) If tratio is greater than the preset threshold convfact 40, save the region label map from the previous iteration to disk along with associated region information, and go to step 6. Otherwise, just go to step 6.

Note that spclust_wght, chk_nregions, convfact, and conv_nregions are user specified parameters (however, default values chk_nregions=64, convfact=1.01, and conv_nregions=2 are usually satisfactory). If spclust_wght=0.0, HSEG is essentially identical to HSWO with convergence checking (step 11) for segmentation hierarchy selection. The associated region information mentioned in step 11 above is the region number of pixels list, and optionally includes the boundary region map, the region number of boundary pixels list, the region mean vector list, the region standard deviation list, and the region maximum merging threshold list (for each region, the maximum merging threshold at which any merge occurred in the formation of the region).

Figure 9:
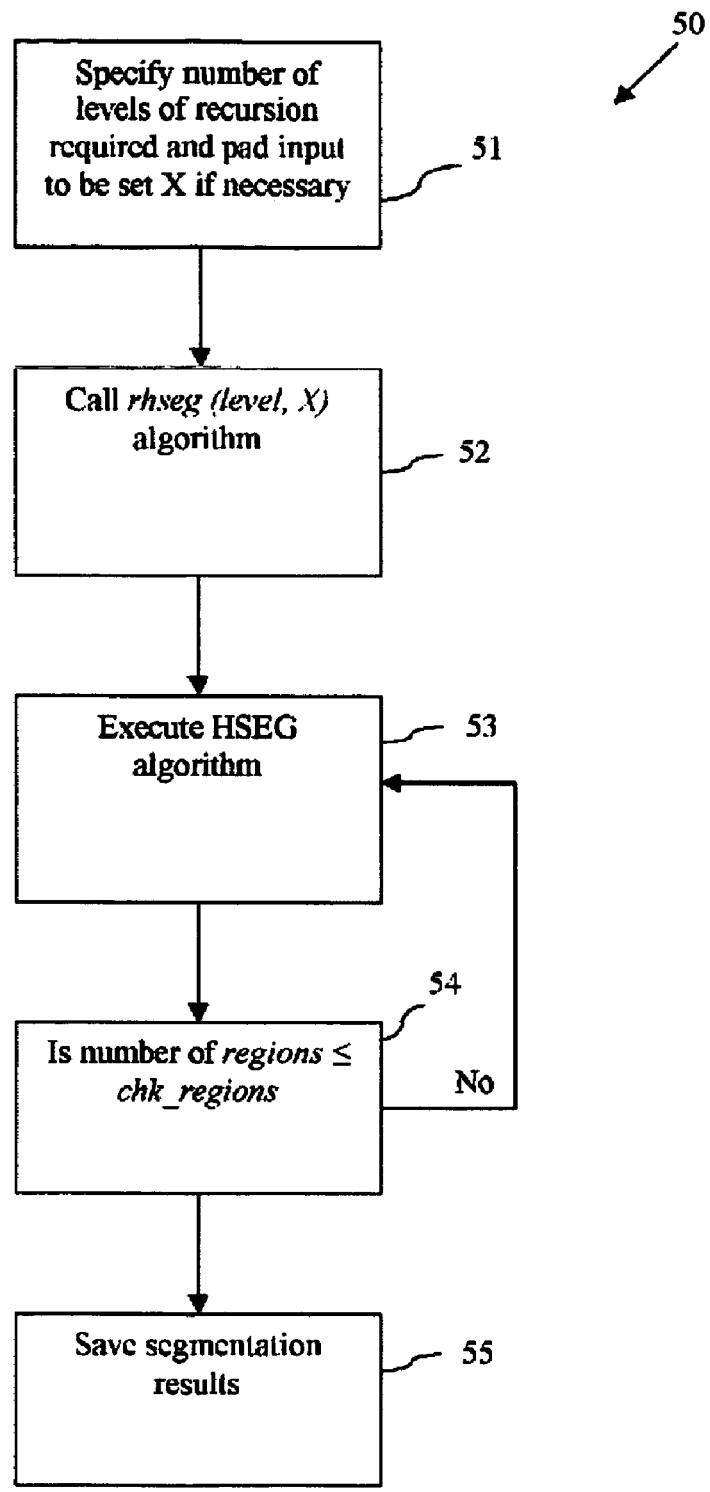
FIG. 9 is a flow chart representing a recursive formulation of the HSEG algorithm.

A recursive formulation of HSEG, called RHSEG 50, is shown in FIG. 9.

1. Given an input data set X, specify the number of levels of recursion required (rnb_levels) and pad the input data set, if necessary, so the width and height (or length) of the data set can be evenly divided by $2^{mb\_levels-1}$ 51. (A good value for rnb_levels results in a data section at level=rnb_levels consisting of roughly 1000 to 4000 data points.) Set level=1.
2. Call rhseg(level,X) algorithm 52.
3. Execute the HSEG algorithm (as above) 53 using as a pre-segmentation the segmentation output by the call to rhseg( ) in step 2. (Continue executing HSEG until the number of regions reaches chk_nregions 54 and save the segmentation results 55 as specified in step 11 of the HSEG algorithm.)

Figure 10A:
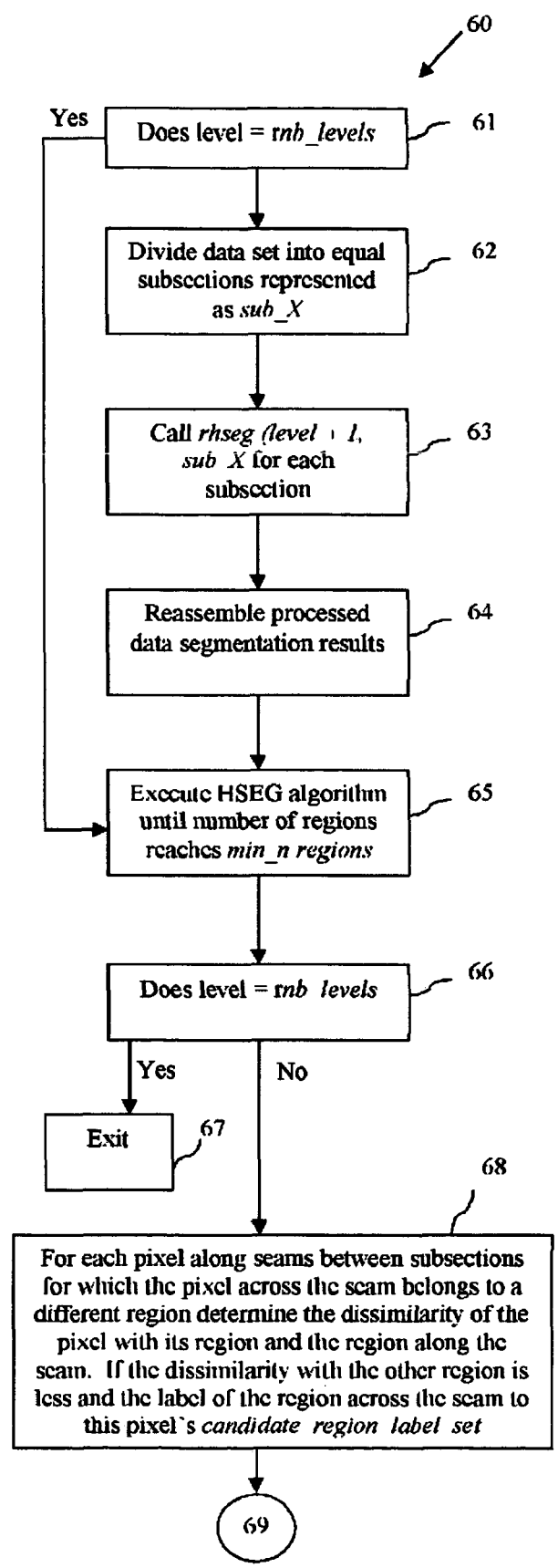
FIGS. 10A and 10B are a flow chart representing the "switch pixels" rhseg(level,X) algorithm.
Figure 10B:
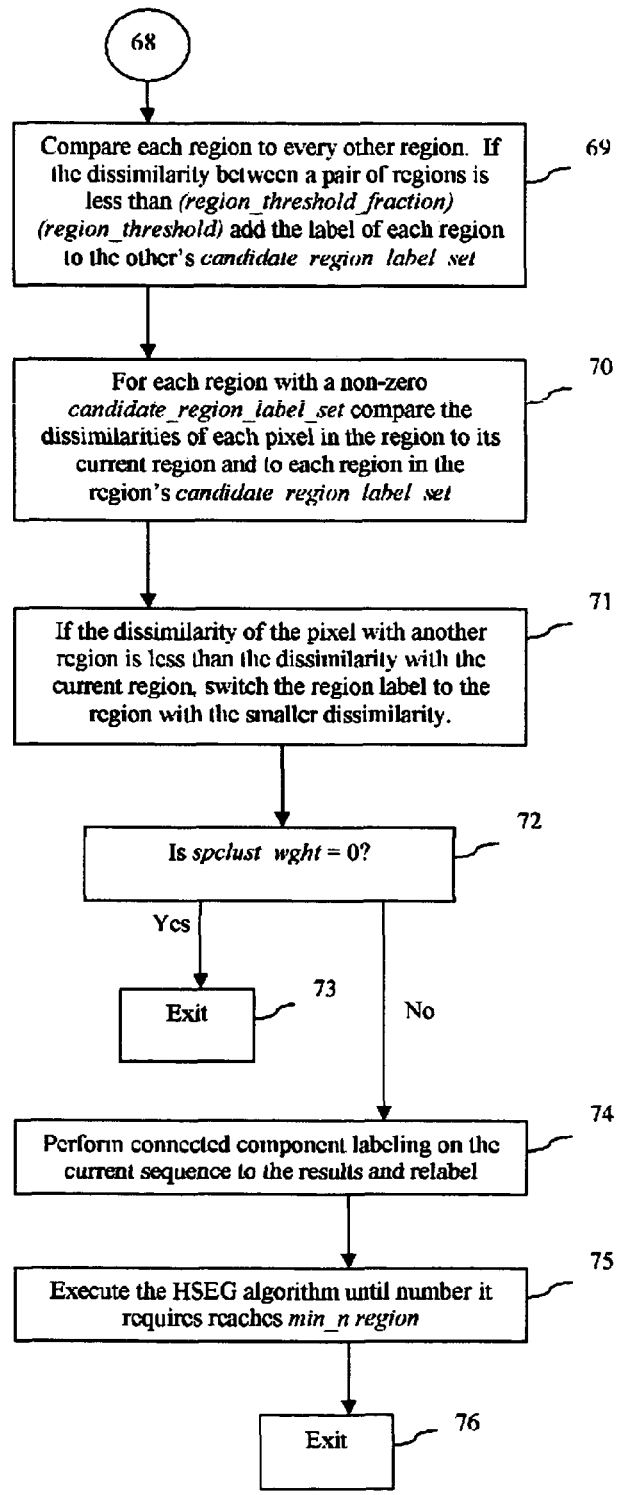

An outline of the "switch pixels" rhseg(level,X) algorithm 60 is shown in FIGS. 10A and 10B and described as follows:

If level=rnb_levels 61, go to step 3. Otherwise, divide the data set into equal subsections 62. For n-spatial dimension data, divide the data set into equal sections, halving each spatial dimension. For 1-spatial dimension data, divide into two equal sections; for 2-spatial dimension data, divide into four equal sections; and for 3-spatial dimension data, divide into eight equal sections.

1. and call rhseg(level+1,sub_X) 63 for each subsection of the data set (represented as sub_X).
2. After the calls to rhseg( ) for each data set subsection from step 1 complete processing, reassemble the data segmentation results 64.
3. Execute the HSEG algorithm as described above 65 (using the reassembled segmentation results are as the pre-segmentation when level<rnb_levels), with the following modification: Terminate the algorithm when the number of regions reaches the preset value min_nregions (if level=1, terminate at the greater of min_nregions or chk_nregions).
4. If level=rnb_levels 66, exit 67. Otherwise, switch the region assignment of certain pixels in the following manner:
    (i) For each region initialize a candidate_region_label_set (of C++ data type set) to zero size. Let seam_threshold_factor, region_threshold_factor, and switch_pixels_factor be user set parameters (the default value for each parameter of 1.5 works well for many data sets). Also, let max_threshold be the maximum merging threshold encountered in step 3 above. For each region, accumulate entries to the candidate_region_label_set in the following two ways:
        a. For each pixel contained in the pairs of rows and columns along the seam between the data subsections reassembled in step 2 for which the pixel across the seam belongs to a different region 68, do the following: Calculate the dissimilarity between the pixel and its current region (own_region_dissim), and calculate the dissimilarity between the pixel and the region of the pixel across the seam (other_region_dissim). If own_region_dissim>seam_threshold_factor*other_region_dissim, add the region label of the region of the pixel across seam to the candidate_region_label_set of this pixel's region.
        b. Compare each region to every other region 69. If the dissimilarity between a pair of regions is less than region_threshold_factor*max_threshold, add the region label of each region to the other region's candidate_region_label_set.
    (ii) For each region with a non-zero sized candidate_region_label_set, compute the dissimilarity of each pixel contained in that region to its current region (own_region_dissim) and to each region in the region's candidate_region_label_set (other_region_dissim) 70. If a pixel is found to have own_region_dissim>switch_pixels_factor*other_region_dissim, switch the region label for that pixel to the region with the minimum other_region_dissim value 71. (In the case of two regions in the list having equal other_region_dissim values, the region with the smallest region label is chosen.)
    (iii) If spclust_wght>0.0 72, exit 73. Otherwise perform connected component labeling on the current segmentation results and relabel accordingly 74. Then execute the HSEG algorithm 75 on the data X with the following modification: Terminate the algorithm when the number of regions reaches the preset value min_nregions (if level=1, terminate at the greater of min_nregions or chk_nregions). Exit 76.

In step 4 data points on the seam between the data subsections are analyzed to find pairs of regions that may contain pixels that are more similar to the other region. All of the regions are also compared to each other directly, and regions that are relatively similar to each other are assumed to contain pixels that may be more similar to the other region. The first approach identifies pairs of regions that occur as neighbors across the processing window seam that contain pixels that are more similar to the other region, no matter how similar the region pair is to each other. This approach is most effective at eliminating obvious blocky artifacts at the processing window seam. The second approach identifies pairs or regions that are relatively similar to each other, and thus may contain pixels that are more similar to the other region, even though the pair of regions may not occur as neighbors across a processing window seam. This approach is most effective at eliminating more diffuse processing window artifacts.

This is very efficient because it focuses specifically on the regions that are involved in the processing window artifacts. In addition, performing the pixel switching after performing the HSEG algorithm as in step 3 enhances processing efficiency. Pixel switching (as in step 4) could be performed before step 3, but then a number of pixels would be switched between pairs of regions that would end up getting merged together in step 3.

Figure 2:
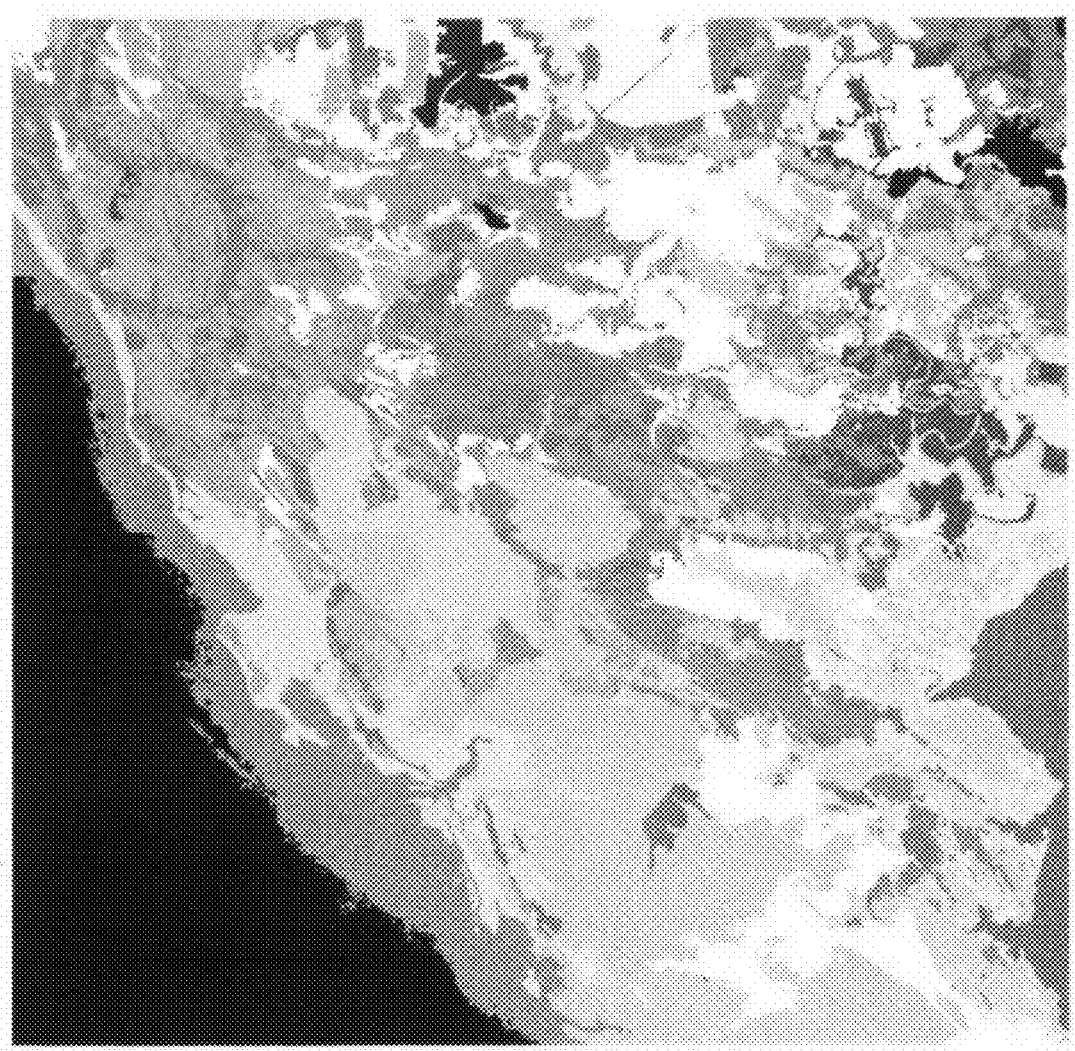
FIG. 2 is an example of the satellite image of FIG. 1 after segmentation into 96 regions according to the basic RHSEG algorithm with spclust_wght=1.0.
Figure 3:
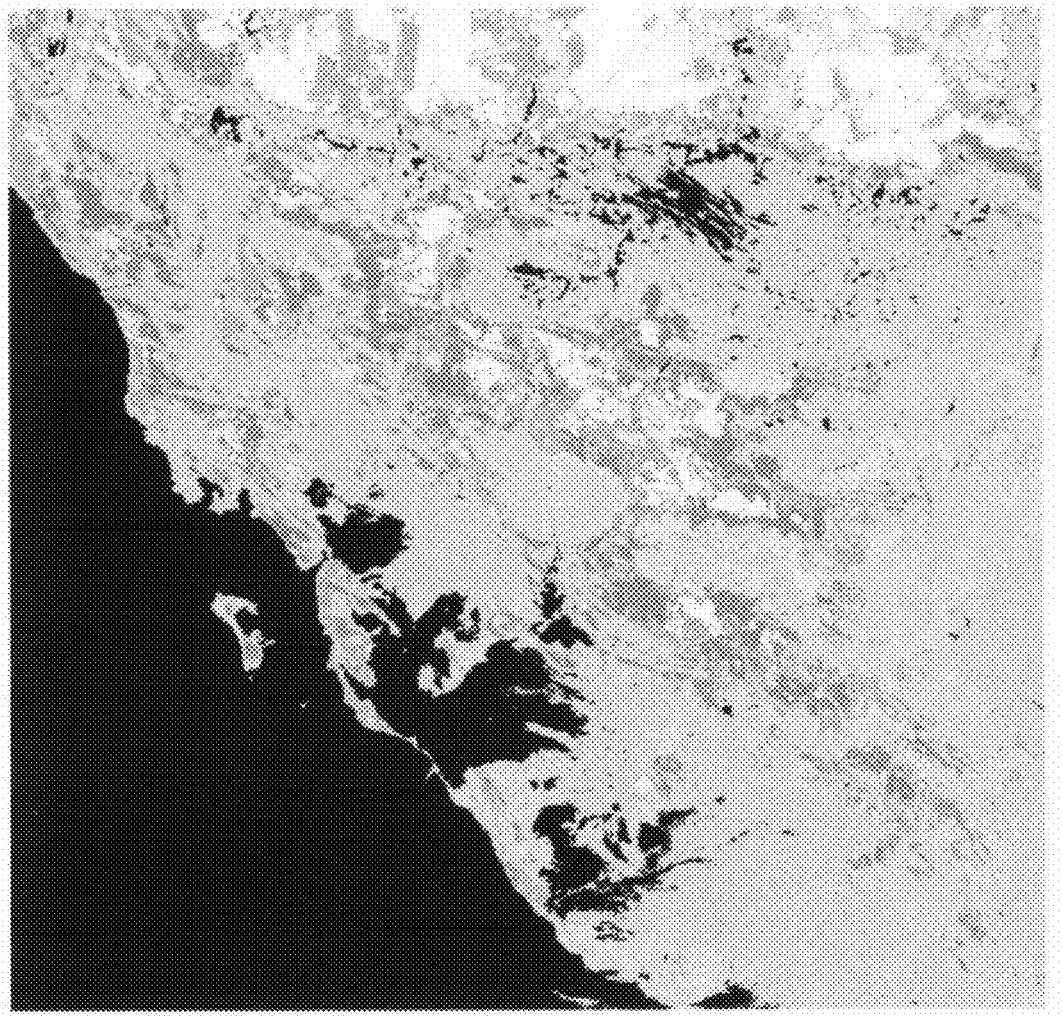
FIG. 3 is an example of the satellite image of FIG. 1 after segmentation into 8 regions and utilizing the switch pixels approach to eliminating processing artifacts and spclust_wght=0.1.

FIG. 3 shows the segmentation of the image of FIG. 1 into 8 regions produced by the "switch pixels" approach for eliminating processing window artifacts, which is summarized above. The program was run with spclust_wght=0.1 and with the other parameters set to program defaults. The processing window artifacts are clearly eliminated. However, in addition to the elimination of the processing window artifacts, the nature of the segmentation result shown in FIG. 3 is very different from that in FIG. 2.

There are two main reasons for the difference in the nature of the segmentation results in these two cases. The first reason is evidenced by the fact that 96 regions are required in FIG. 2 to represent a segmentation with equivalent mean-square error based dissimilarity to the 8 region segmentation in FIG. 3. The dissimilarity between the region mean image and the original image data is 0.444 for FIG. 2 and 0.423 for FIG. 3.

In the process that produced FIG. 2, merges performed within a small processing window cannot be undone as the recursion returns to levels with larger processing windows. This discourages the merging of regions that originated in widely separated local processing windows, and results in requiring many more regions to describe the image with the same fidelity. Because of the efficiency of describing the image with the same fidelity in many fewer regions, the segmentation result in FIG. 3 is better than the result of FIG. 2.

However, the second reason for the difference in the nature of the segmentation results is not as positive. The hierarchical data segmentation algorithm, HSEG, utilizes the parameter spclust_wght to control the relative importance of merges between spatially adjacent regions and merges between spatially non-adjacent regions. When spclust_wght=0.0, only merges between spatially adjacent regions are allowed. When spclust_wght=1.0, merges between spatially adjacent and spatially non-adjacent regions are given equally priority. For values of spclust_wght between 0.0 and 1.0, spatially adjacent merges are given priority over spatially non-adjacent merges by a factor of 1.0/spclust_wght.

Figure 4:
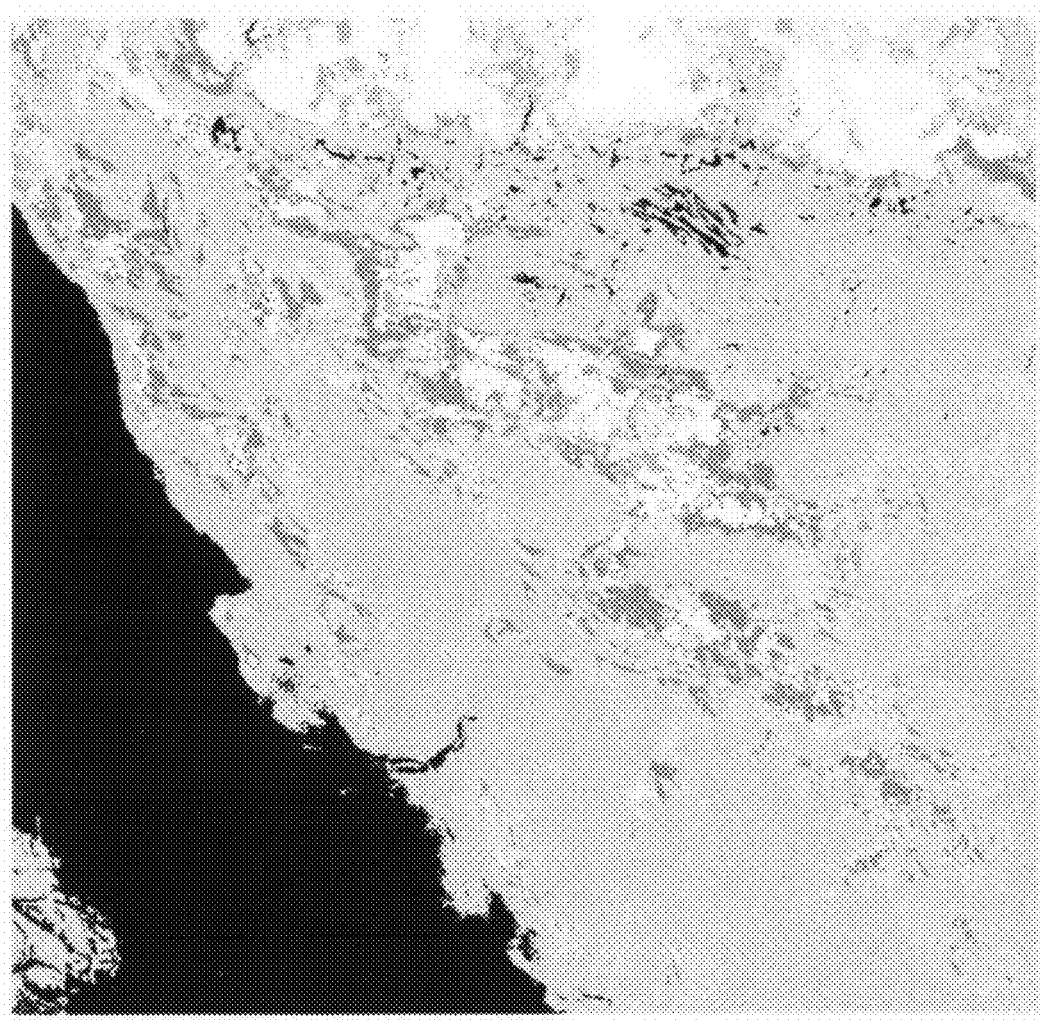
FIG. 4 is an example of the satellite image of FIG. 1 after segmentation into 8 regions and utilizing the switch pixels approach to eliminating processing artifacts and spclust_wght=1.0.

A problem with the "switch pixels" approach to eliminating processing artifacts is that it does not have any mechanism for giving priority to spatial adjacency in its process for switching pixels from one region to another. Because of this, the segmentation results produced by this approach for all values of spclust_wght greater than 0.0 are very similar to the results for spclust_wght=1.0. As an example of this, FIG. 4 shows the segmentation of this image into 8 regions produced by the "switch pixels" approach described with spclust_wght=1.0 and other program parameters set to program defaults. FIG. 3 is much more similar to FIG. 4 than it is to FIG. 2.

Figure 5:
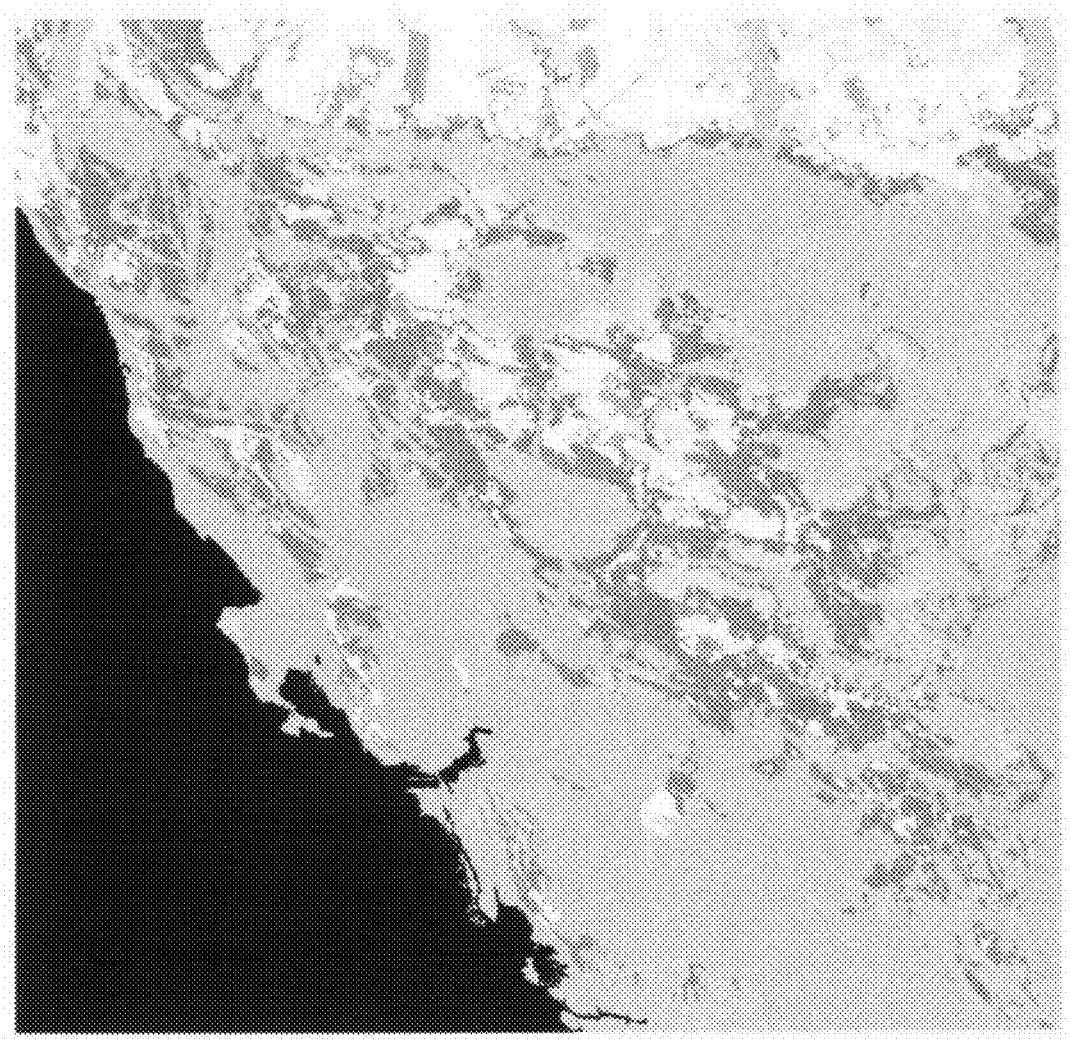
FIG. 5 is an example of the satellite image of FIG. 1 after segmentation into 10 regions by the RHSEG algorithm with the spclust_wght=1.0 and utilizing the split-remerge method of eliminating processing artifacts according to the invention.

The current disclosure describes an innovative "split-remerge" approach to eliminating processing artifacts that splits certain pixels out from regions they are assigned to and remerges them into perhaps another, more similar, region, while giving the appropriate priority to spatial adjacency. FIG. 5 shows the 10 region segmentation the result from running RHSEG with the "split-remerge" approach to eliminating processing window artifacts. The program was run with spclust_wght=0.1 and other program parameters set to program defaults.

Comparing the segmentation result from FIG. 5 to the results from FIGS. 3 and 4, more coherent regions are obvious in FIG. 5, with many fewer small sub-regions. This is the effect of spclust_wght=0.1 in the process that produced FIG. 5. In this sense, FIG. 5 is more similar to FIG. 2, which also has more coherent regions with many fewer small sub-regions.

Besides the elimination of processing window artifacts, the difference between the segmentation results shown in FIG. 2 and FIG. 5 is due mainly to a subtle effect of the processing window elimination process. As noted earlier, in the process that produced FIG. 2, merges performed within a small processing window cannot be undone as the recursion returns to levels with larger processing windows. This discourages the merging of regions that originated in widely separated local processing windows, and results in requiring many more regions to describe the image with the same fidelity. However, as part of the processing window artifact elimination process, certain image pixels are split out from the region they were originally assigned to and allowed to become members of a different region. This is true for both the "switch pixels" and "split-remerge" approaches. This allows for the adjustment of the regions to better describe the image in a global sense, which makes possible the characterization of the image with fewer regions at the same fidelity of representation. The essential difference between the "switch pixels" approach and the "split-remerge" approach described herein is in how the pixels are given a new region assignment. With the "split-remerge" approach, appropriate priority is given to spatially adjacent region merges in the pixel reassignment, while in the "switch pixels" approach spatially adjacent and spatially non-adjacent merges are given equal priority in the pixel reassignment.

The software innovation described below provides hierarchical segmentations of data that are free of processing window artifacts and with maximum flexibility in controlling the nature of the segmentation results with the spclust_wght parameter. The innovation allows the spclust_wght parameter to have full effect over its permissible value range while producing results free of processing window artifacts. The RHSEG algorithm shown in FIG. 9 is employed with a split-remerge version of the rhseg(level,X) algorithm.

Figure 11A:
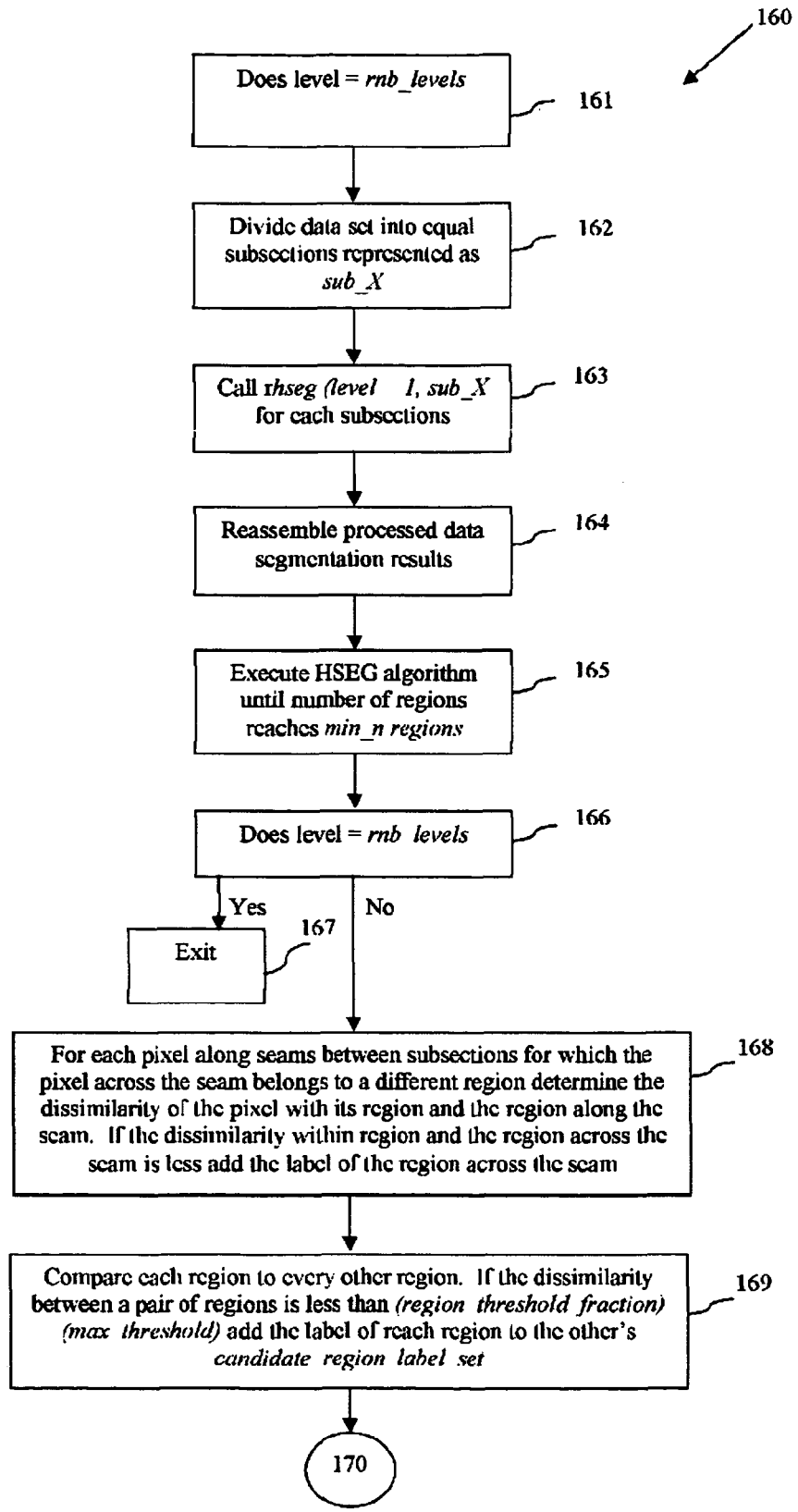
FIGS. 11A and 11B are a flow chart representing the "split-remerge" rhseg(level,X) algorithm.
Figure 11B:
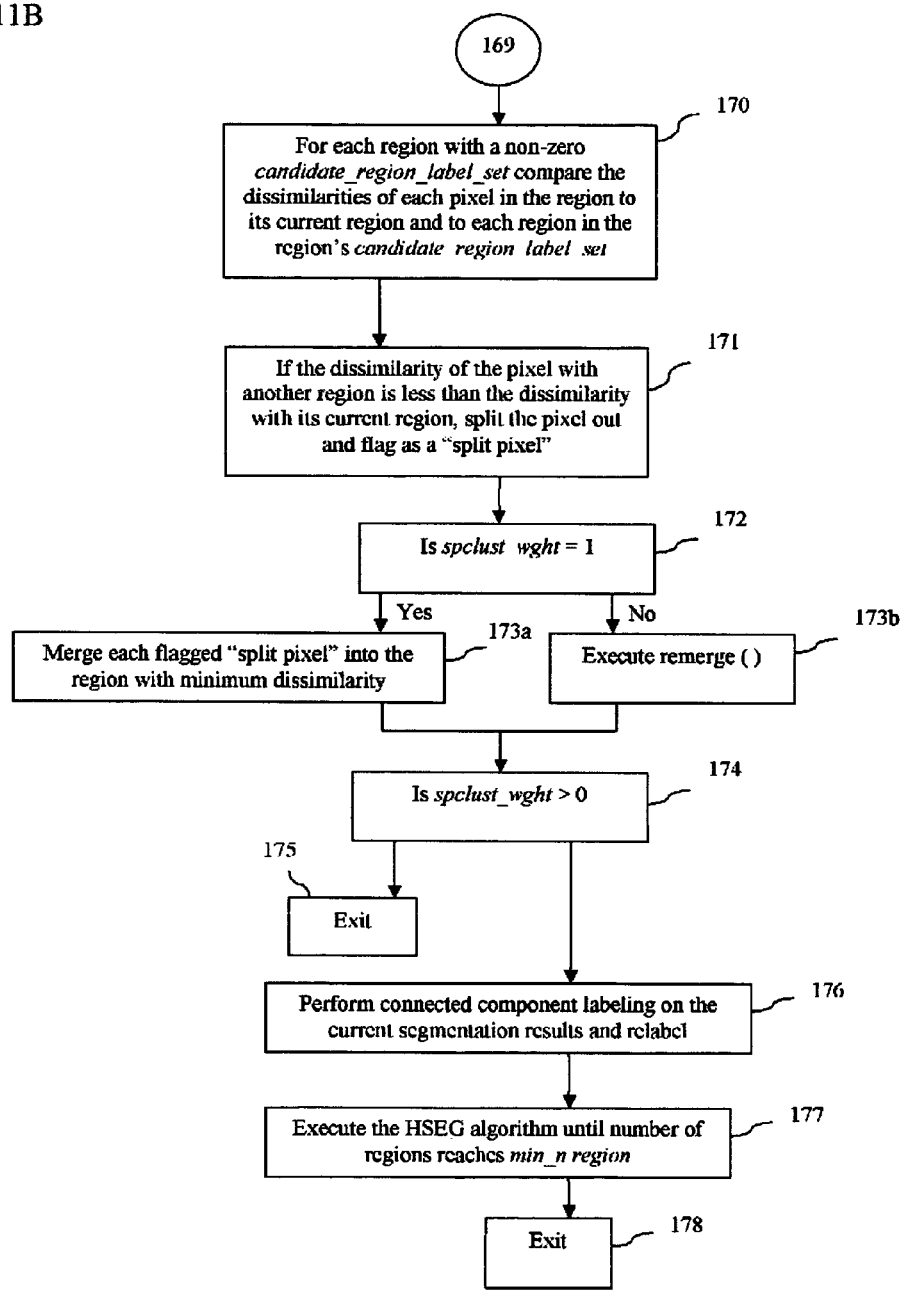

An outline of the split-remerge rhseg(level,X) algorithm 160 is shown in FIGS. 11A and 11B and described as follows:

1. If level=rnb_levels 161, go to step 3. Otherwise, divide the data set into equal subsections 162 and call rhseg(level+1, sub_X) for each subsection of the data set (represented as sub_X) 163.
2. After the calls to rhseg( ) for each data set subsection from step 1 complete processing, reassemble the data segmentation results 164.
3. Execute the HSEG algorithm (as described in connection with FIGS. 8A and 8B, using the reassembled segmentation results are as the pre-segmentation when level<rnb_levels), with the following modification: Terminate the algorithm when the number of regions reaches the preset value min_nregions (if level=1, terminate at the greater of min_nregions or chk_nregions) 165.
4. If level=rnb_levels 166, exit 167. Otherwise, modify the region assignment of certain pixels in the following manner:
   (i) For each region initialize a candidate_region_label_set (of C++ data type set) to zero size. Let seam_threshold_factor, region_threshold_factor, and split_pixels_factor be user set parameters (the default value for each parameter of 1.5 works well for many data sets). Also, let max_threshold be the maximum merging threshold encountered in step 3 above. For each region, accumulate entries to the candidate_region_label_set in the following two ways:
      a. For each pixel contained in the pairs of rows and columns along the seam between the data subsections reassembled in step 2 for which the pixel across the seam belongs to a different region, do the following:

Calculate the dissimilarity between the pixel and its current region (own_region_dissim), and calculate the dissimilarity between the pixel and the region of the pixel across the seam (other_region_dissim). If own_region_dissim>seam_threshold_factor*other_region_dissim, add the region label of the region of the pixel across seam to the candidate_region_label_set of this pixel's region 168.

b. Compare each region to every other region. If the dissimilarity between a pair of regions is less than region_threshold_factor*max_threshold, add the region label of each region to the other region's candidate_region_label_set 169.

(ii) For each region with a non-zero sized candidate_region_label_set, compute the dissimilarity of each pixel contained in that region to its current region (own_region_dissim) and to each region in the region's candidate_region_label_set (other_region_dissim) 170. If a pixel is found to have own_region_dissim>split_pixels_factor*other_region_dissim, split the pixel out from its current region and flag as a "split pixel."

(iii) If spclust_wght=1.0, for each pixel flagged as a "split pixel," merge it into the region for which it has the minimum other_region_dissim value of the regions in the candidate_region_label_set of the region it previously belonged to 173a. (In the case of two regions in the list having equal other_region_dissim values, the region with the smallest region label is chosen.) Otherwise, execute remerge(level,max_threshold,X) on the current region labeling (the function remerge( ) is outlined below).

(iv) If spclust_wght>0.0 174, exit 175. Otherwise perform connected component labeling on the current segmentation results and relabel accordingly 176. Then execute the HSEG algorithm on the data X 177 with the following modification: Terminate the algorithm when the number of regions reaches the preset value min_nregions. Exit 178.

Notice the differences between this split-remerge version of RHSEG and the switch pixels version in FIG. 8. In step 4(ii) of the switch pixels version, pixels that have own_region_dissim>switch_pixels_factor*other_region_dissim are directly switched from their current region assignment to the most similar region in the current region's candidate_region_label_set. In step 4(ii) of the split-remerge version, pixels that have own_region_dissim>split_pixels_factor*other_region_dissim are just split out from their current region, and flagged as a "split out" pixel (note that switch_pixels_factor has been renamed to split_pixels_factor).

In this split-remerge version, a new step 4(iii) is added between the step 4(ii) and step 4(iii) of the switch pixel version. In the case where spclust_wght=1.0, the pixels that were flagged as being "split out" in step 4(ii) are simply merged into the region for which it has the minimum other_region_dissim value of the regions in the candidate_region_label_set of the region it previously belonged to. This makes the combination of steps 4(ii) and 4(iii) for the current version equivalent to step 4(ii) of the previous version for spclust_wght=1.0. However, for spclust_wght<1.0, the current version of RHSEG is very different from the previous version.

Figure 12:
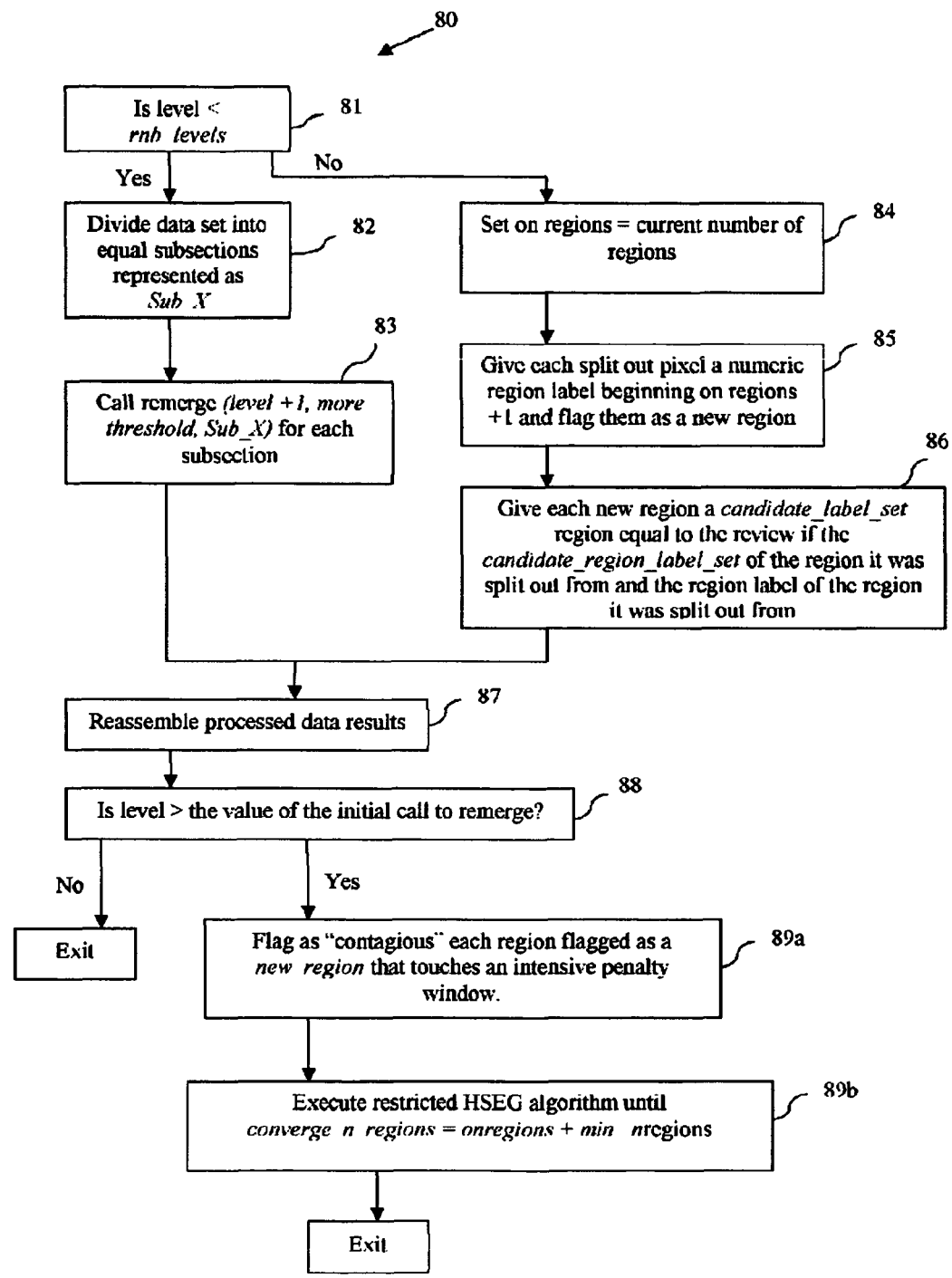
FIG. 12 is a flow chart representing the recursive remerge (level, max_threshold, X) function.

For spclust_wght<1.0, the current version executes remerge(level,max_threshold,X) on the current region labeling. The remerge( ) function is one of the key innovations, which directly and through its use of a restructed HSEG algorithm introduces contagious regions. This recursive remerge(level,max_threshold,X) function 80 is outlined below and illustrated in FIG. 12:

1. If level<rnb_levels 81, divide the data set into equal subsections (as in rhseg( ) and call remerge(level+1, max_threshold,sub_X) 83 for each subsection of the data set (represented as sub_X) 82, and go to step 2. Otherwise, let onregions=current number of regions, which are labeled 1 to onregions 84. Give each split out pixel a numeric region label, starting at onregions+1, and flag them as a new_region 85. Give each new region a candidate_region_label_set equal to the candidate_region_label_set of the region it was split out from and add to that set the region label of the region it was split out from 86.

2. After the calls to remerge( ) for each data set subsection from step 1 complete processing, reassemble the data segmentation results 87 (for all but the first subsection, the regions flagged as new_region must be renumbered to not duplicate labels of the new regions from the previous subsections).

3. If level>the value of level at the initial call to remerge 88, flag as contagious each region flagged as a new_region that touches an interior processing window. Then, execute a restricted version of the HSEG algorithm as described below 89a (if level<rnb_levels, use the reassembled segmentation results a pre-segmentation), terminating when the number of regions equals converge_nregions= onregions+min_nregions 89b. Exit.

Figure 13A:
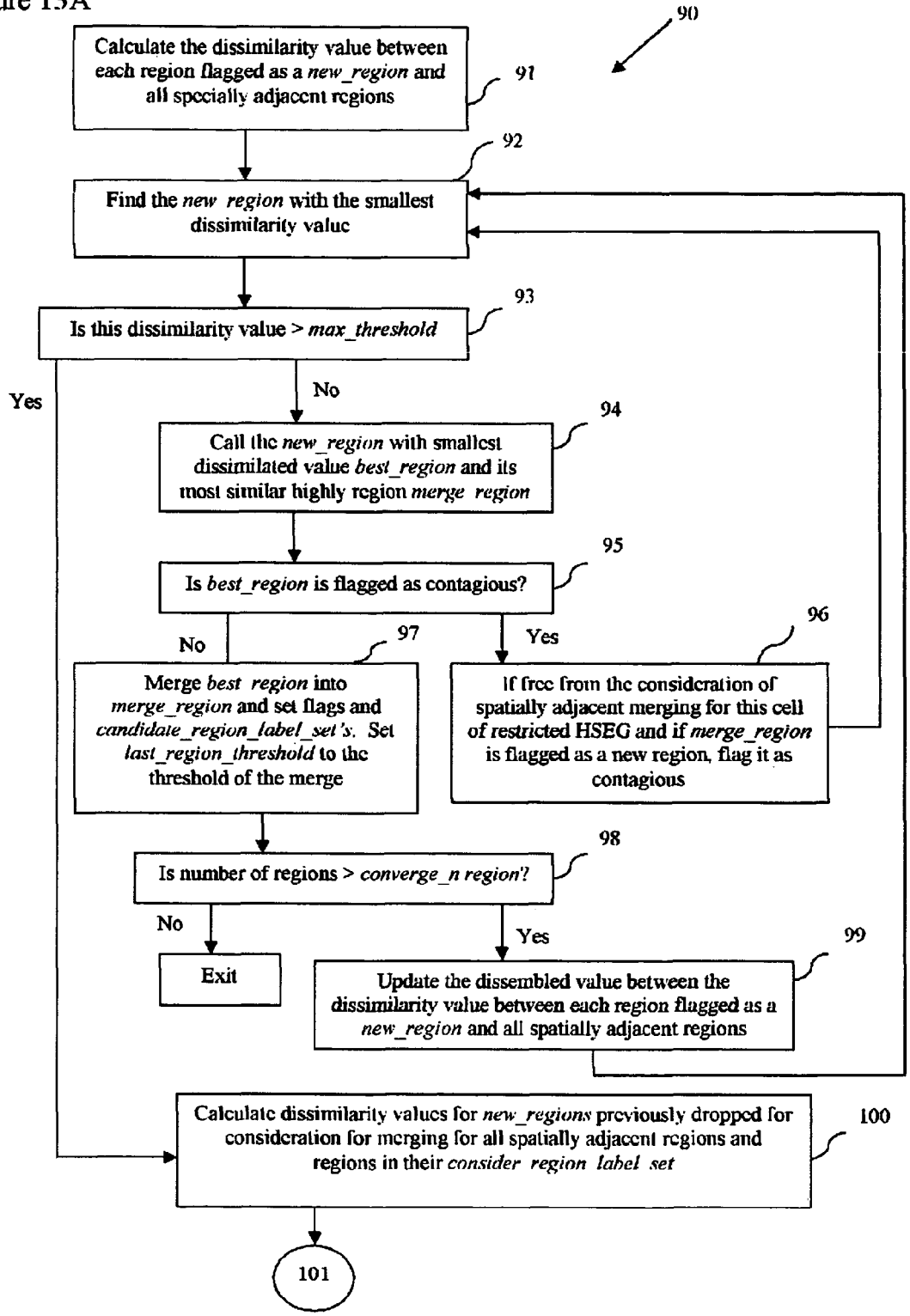
FIGS. 13A and 13B are a flow chart representing the restricted HSEG algorithm.
Figure 13B:
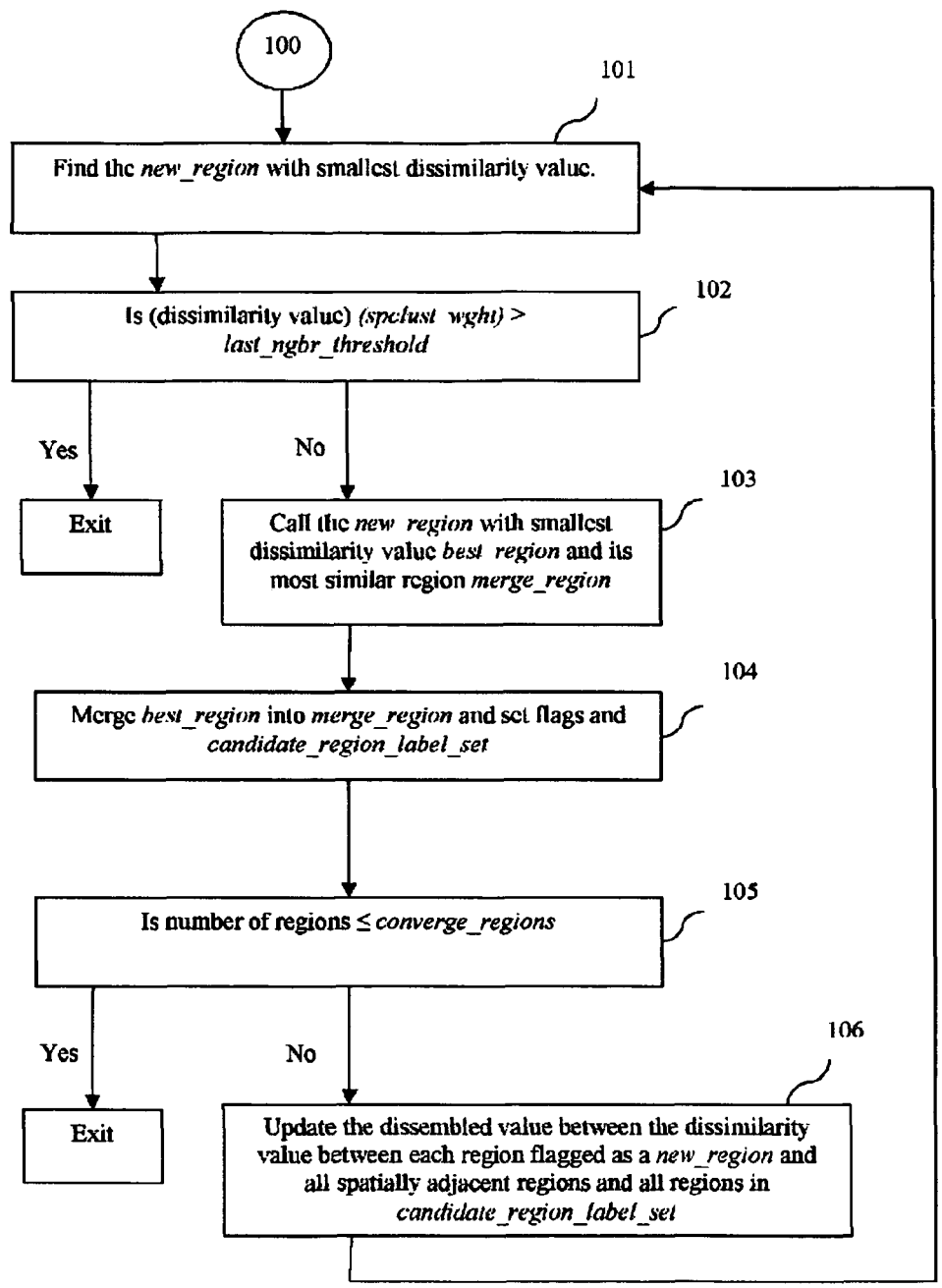

An outline of restricted HSEG 90 follows and is illustrated in FIGS. 13A and 13B:

1. For all regions flagged as a new_region, calculate the dissimilarity value, dissim_val, between it and all spatially adjacent regions (including regions not flagged as a new_region) 91.

2. Out of the regions flagged as a new_region, find the region with smallest dissim_val 92 (ties are resolved in the same manner used for HSWO). If dissim_val>max_threshold 93, go to step 5. Otherwise, call this region best_region and its most similar neighboring region merge_region 94.

3. If best_region is flagged as contagious 95, drop best_region from further consideration of spatially adjacent merging (for this call to restricted HSEG) 96, and, if merge_region is flagged as a new_region, flag it as contagious. Go to step 2.

4. Merge best_region into merge_region 97 (if merge_region is flagged as a new_region, it retains its new_region flag, and the candidate_region_label_set's of the two regions are combined). If the number of regions>converge_nregions 98, update as necessary the dissim_val's of regions flagged as a new_region and their spatially adjacent regions 99, and go to step 2. Otherwise, exit.

5. Returning the regions previously dropped from merging back into consideration, calculate the dissimilarity value, dissim_val, between the regions flagged as a new_region and all spatially adjacent regions (including regions not flagged as a new_region). Also calculate the dissimilarity value, dissim_val, between the regions flagged as a new_region and all regions in their candidate_region_label_set 100. Let last_ngbhr_thresh be the threshold of the last merge that occurred in step 4 above.

6. Out of the regions flagged as a new_region, find the region with smallest dissim_val 101 (ties are resolved in the same manner used for HSWO). If dissim_val*spclust_wght>last_nghbr_threshold 102, exit. Otherwise, call this region best_region and its most similar region merge_region 103.

7. Merge best_region into merge_region 104 (if merge_region is flagged as a new_region, it retains its new_region flag, and the candidate_region_label_sets's of the two regions are combined). If the number of regions<=converge_nregions 105, exit. Otherwise, update as necessary the dissim_val's of regions flagged as a new_region and their spatially adjacent regions and all regions in their candidate_region_label_set 106. Go to step 6.

The remerge( ) function is called recursively from the recursive level it was initially called from in step 4(iii) of the rhseg( ) function. At recursive level rnb_levels specially flagged single pixel regions are formed from the pixels that were split out from their region assignment in the current processing window. These new regions have their new_region flag set true, and any of these new regions that are located on an interior processing window boundary have their contagious flag set true. In addition, each of these new regions have their candidate_region_label_set set equal to the candidate_region_label_set of the region it previously belonged to augmented by the label of the region it previously belonged to (to allow for the possibility of merging back into the previous region).

In the restricted version of HSEG, nearest neighbor merges are considered first up to the maximum merge threshold previously encountered in the last call to the unrestricted version of HSEG. These nearest neighbor merges are constrained by delaying merges involving regions touching the interior processing window boundaries until those regions no longer are on a processing window boundary or the recursive level is reached from which the remerge( ) function was initially called from.

If the number of regions converge_nregions is not reached during the processing of the nearest neighbor merges, more general merges are considered. These merges are not constrained by the contagious flag, and consider possible merges in each region's candidate_region_label_set in addition to the neighboring regions. In this case the merges are constrained by last_nghbr_threshold*spclust_wght as well as converge_nregions.

Figure 6:
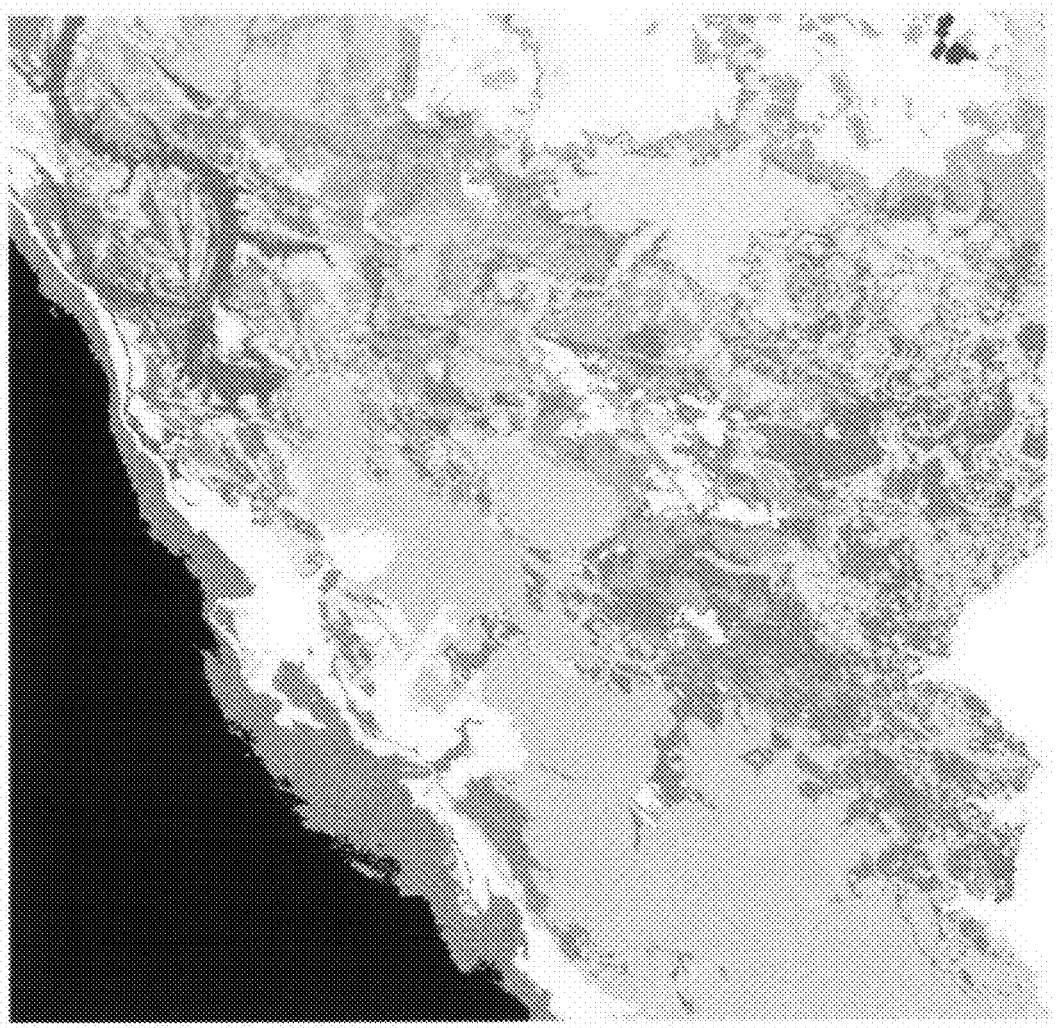
FIG. 6 is an example of the satellite image of FIG. 1 after segmentation into 31 regions using the split-remerge procedure of the invention to process artifacts, but without the contagious pixel aspect implemented.

The contagious region aspect of the restricted version of HSEG is a very important part of this new innovation in the processing window artifact elimination process. Without it, processing window artifacts are reintroduced, as demonstrated by the results displayed in FIG. 6.

When the contagious region concept is incorrectly implemented, it will be less computationally efficient than the current approach. This is because when the contagious region idea is applied to the region growing process starting at single pixel regions over the entire processing window, considering contagious regions at the interior processing window boundaries invariably causes merging to stop at a number of regions much higher the usual value of min_nregions utilized in the current version of RHSEG. Larger values of min_nregions have a deleterious effect on processing time. However, the contagious region approach does not lead to these problems in the current implementation since it is applied only to a subset of regions corresponding to a very limited subset of image pixels, and since after nearest neighbor merges are stopped by all new regions becoming contagious, additional general merges may be performed. These additional merges do not lead to artifacts because for the most part the merges involve merges of the new regions into globally defined "old" regions, and because a large number of nearest neighbor merges have already occurred.

As shown in Table 1, the processing times required by HSEG and RHSEG for spclust_wght>0.0 are generally longer than required with spclust_wght=0.0. The contrast in processing times is most pronounced for HSEG (rnb_levels=1) as the image size grows. Even for a very moderate image size, 256×256 pixels, the processing time required by HSEG for spclust_wght>0.0 is about 235 times longer than that required by HSEG for spclust_wght=0.0. This is because the number of regions that need to be compared in the early stages of HSEG is on the order of $N^2$ when spclust_wght>0.0, while the number of regions that need to be compared in the early stages of HSEG is on the order of N*n when spclust_wght=0.0, where N is the number of pixels in the image and n is the size of a pixel neighborhood (eight neighbors, by default). This increase in processing time is much less pronounced for RHSEG using the default values for rnb_levels. In this case, for the image sizes tested, the processing time for the parallel version of RHSEG with spclust_wght>0.0 is up to about 4 to 5 times longer than that for RHSEG with spclust_wght=0.0. This is because the number of regions that need to be compared in the early stages of RHSEG is limited, by default, to no more than 2048 regions.

Functional Operation of the Algorithm in Software and Parameters

Provided in this section is a user's guide-like description of the parameters used in the HSEG and RHSEG algorithms (HSEG is simply RHSEG with rnb_levels=1) embedded in a software program. This implementation assumes the input data is one or two-spatial dimension single-band, multispectral of hyperspectral image (or image-like) data. Selection between the single processor version and the multiprocessor (parallel) version is made through use of a compiler preprocessing directive.

The single processor version of RHSEG is run from the command line with the command:

rhseg parameter_file_name where parameter_file_name is the name of the input parameter file (for contents, see below). The parallel (multiprocessor) version of RHSEG is run from the command line with the command:

rhseg parameter_file_name inb_levels onb_levels where parameter_file_name is the name of the input parameter file (for contents, see below). The other command line parameters for the parallel version are:

| | | |
|---|---|---|
| inb_levels | (short unsigned int) | Data input recursive level. (1 ≤ inb_levels ≤ rnb_levels) |

(See below for the description of rnb_levels.) This is the recursive level at which the input data is input. Processing at recursive levels>inb_levels is performed sequentially. This parameter is used to optimize the parallel processing efficiency. The optimal value depends on the parallel processing hardware and the size of the data being processed.

The value of inb_levels determines the number of processors (numprocs) utilized in the parallel version. For two-spatial dimension data as input, numprocs=$4^{inb\_levels-1}$ For 1-dimensional data, numprocs=$2^{inb\_levels-1}$, and for 3-dimensional data, numprocs=$8^{inb\_levels-1}$.

At program initialization, the input data is parceled out to the numprocs processors, and each processor independently processes each of the numprocs data sections. After each process finishes with its section of data, it transfers the results to the appropriate processor working at recursive level inb_levels−1, etc. until the final stage of processing at recursive level 1.

| onb_levels | (short unsigned int) | Data output recursive level. (1 ≦ onb_levels ≦ inb_levels) |
|---|---|---|

The lowest recursive level at which the input data and other pixel oriented data (such as the region label map) is maintained. As such, it is the recursive level from which the region label map and other pixel-oriented outputs are output from. This parameter is used to optimize the parallel processing efficiency. The optimal value depends on the parallel processing hardware and the size of the data being processed.

TABLE 1

Processing times for HSEG and RHSEG for variations in number of processors, the number of levels of recursion (rnb_levels, where rnb_levels = 1 means no recursion), and spclust_wght. Blank entries signify that the processing would take more than 1 hour.
Timings were performed with 2.4 GHz processors where 1 Gbyte of memory per CPU was available for the single processor runs, and 0.5 Gbyte of memory per CPU was available for the multiple processor runs.

| | | | Processing Times (minutes:seconds) | | |
|---|---|---|---|---|---|
| Image Size | Number of Processors | rnb_levels | spclust_wght = 0.0 | spclust_wght = 0.1 | spclust_wght = 1.0 |
| 0064 × 0064 | 1 | 1 | 0:01 | 0:04 | 0:05 |
| 0128 × 0128 | 1 | 1 | 0:02 | 1:14 | 1:14 |
| 0256 × 0256 | 1 | 1 | 0:05 | 19:28 | 19:36 |
| 0512 × 0512 | 1 | 1 | 0:20 | — | — |
| 1024 × 1024 | 1 | 1 | 1:24 | — | — |
| 0064 × 0064 | 1 | 2* | 0:01 | 0:04 | 0:03 |
| 0128 × 0128 | 1 | 3* | 0:02 | 0:18 | 0:13 |
| 0256 × 0256 | 1 | 4* | 0:08 | 1:47 | 0:56 |
| 0512 × 0512 | 1 | 5* | 0:51 | 8:51 | 3:54 |
| 1024 × 1024 | 1 | 6* | 5:29 | 40:11 | 16:03 |
| 2048 × 2048 | 1 | 7* | 43:57 | — | — |
| 0064 × 0064 | 4 | 2* | 0:01 | 0:02 | 0:02 |
| 0128 × 0128 | 16 | 3* | <0:01 | 0:04 | 0:03 |
| 0256 × 0256 | 64 | 4* | 0:02 | 0:06 | 0:05 |
| 0512 × 0512 | 256 | 5* | 0:02 | 0:11 | 0:09 |
| 1024 × 1024 | 256 | 6* | 0:05 | 0:23 | 0:19 |
| 2048 × 2048 | 256 | 7* | 0:16 | 1:18 | 0:54 |
| 4096 × 4096 | 256 | 8* | 1:08 | 4:35 | 2:45 |
| 6912 × 6528 | 256 | 9* | 3:36 | 8:23 | 4:15 |

*Default value for rnb_levels for this image size.

When RHSEG reaches processing at recursive level onb_levels, the input data, region label map, and any other pixel oriented information is maintained in the processors operating at recursive level onb_levels, and not transmitted up the recursive processing chain. When information relating to the input data or region label map is required at processing levels<onb_levels, this information is passed from the processors active at the onb_levels recursive level through interprocessor communication up to the appropriate process at the current recursive level.

Setting onb_level>1 distributes the pixel-oriented data over $4^{onb\_levels-1}$ processors, and enables the processing of very large images by reducing the computer memory demands per processor.

Figure 14:
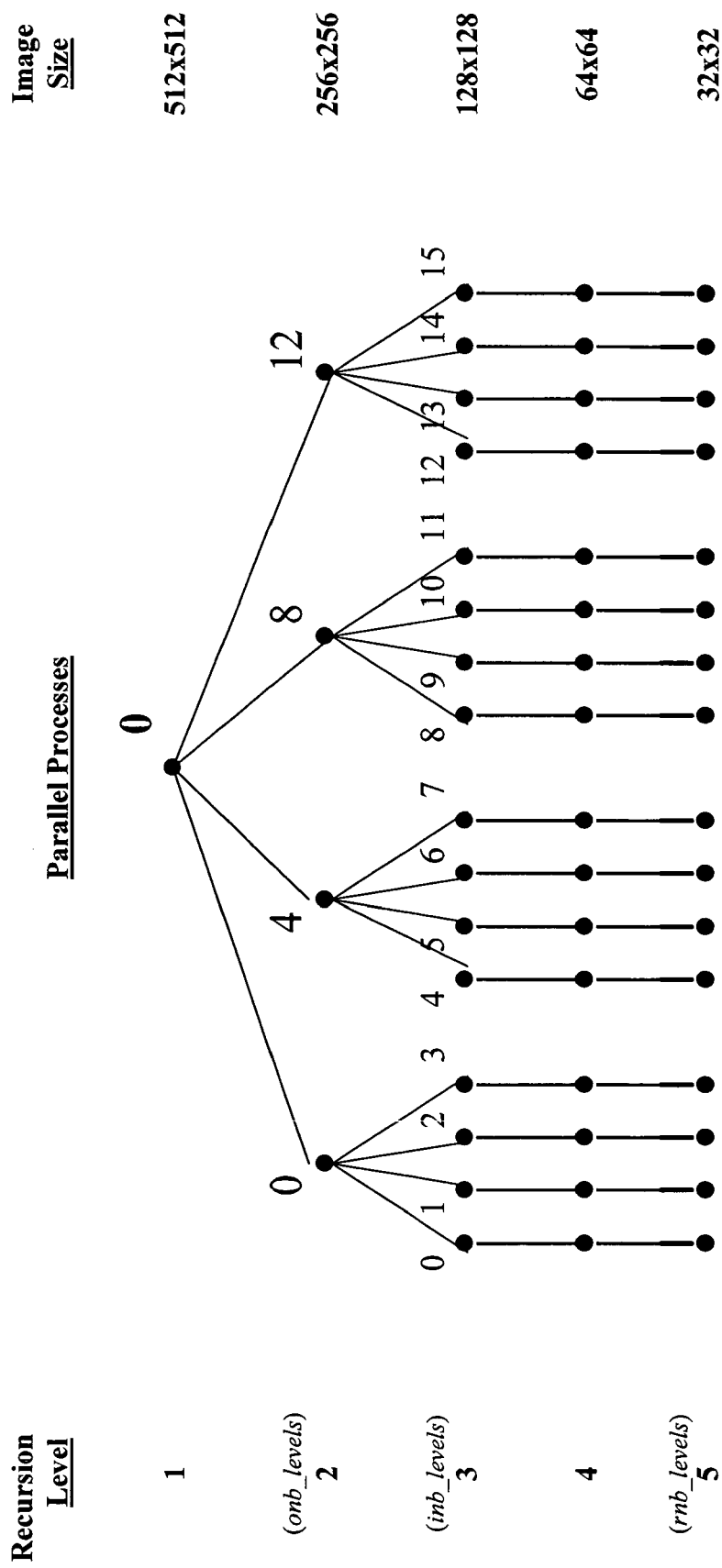
FIG. 14 is a graphical representation of the relationships between the parallel tasks executing the RHSEG program on a parallel computer for a 2-spatial dimension input data set.

See FIG. 14 for a graphical depiction of the relationship between recursive levels rnb_levels, inb_levels and onb_levels. The process numbering for this parallel processing scheme is modified from that introduced in U.S. Pat. No. 6,895,115 to reuse processes at different levels of recursion. In the illustrated case, onb_levels is 2 (2×2=4 data sections on 4 tasks), inb_levels is 3 (4×4=16 data sections on 16 tasks), rnb_levels is 5 (16×16=256 data sections on 16 tasks), and the input image has 512 columns and 512 rows. At program initialization, the input data is split into 16 sections and distributed to the parallel tasks at recursive level inb_levels. From that point, each task recursively divides its data in order to sequentially process its data from recursive levels rnb_levels back up to inb_levels. Once the recursive processing is completed up to recursive level inb_levels, the input and region label map results are sent to tasks running at recursive level inb_levels−1, etc., until recursive level onb_levels is reached. Processing then continues through recursive level 1, but the input data and region label map results remain at recursive level onb_levels. Note that process 0 is active at all levels of recursion, and processes divisible by 4 (corresponding to the onb_levels level of recursion) are active at all levels of recursion, but is otherwise unchanged.

NOTE: The parameters inb_levels and onb_levels are used only in the parallel version and are not defined or used in the single processor version.

The following required parameters specify and describe the input data:

| indata | (string) | Input image data file name |
|---|---|---|

The input image data file from which a hierarchical image segmentation is to be produced. This image data file is assumed to be a headerless binary two-spatial dimension image or image-like data file in band sequential format. The number of columns, rows, spectral bands and the data type are specified by other required parameters (see below). Data types "unsigned char (byte)" and "short unsigned int" are supported.

| | | |
|---|---|---|
| ncols | (int) | Number of columns in input image data (0 < ncols < 65535) |
| nrows | (int) | Number of rows in input image data (0 < nrows < 65535) |
| nbands | (short unsigned int) | Number of spectral bands in input image data (0 < nbands < 65535) |
| dtype | (short unsigned int) | Data type of input image data dtype = 8 designates "unsigned char (byte)" dtype = 16 designates "short unsigned int" (otherwise undefined) |

The following required parameters specify output files:

| | | |
|---|---|---|
| rlblmap | (string) | Output region label map data file name |

The region label map at the finest level of segmentation detail (hierarchical level 0). Together with regmerges (see below), this forms the main output of RHSEG. Region label values of "0" correspond to invalid input data values in the input image data. Valid region label values range from 1 through 65535. The data is of data type "short unsigned int."

| | | |
|---|---|---|
| regmerges | (string) | Output region label map merges list file name |

The region merges list file consists of the renumberings of the region label map required to obtain the region label map for the second most detailed level (hierarchical level 1) through the coarsest (last) level of the segmentation hierarchy from rlblmap (see above). The data type is "short unsigned int." The data is stored as rows of values, with the column location (with counting starting at 1) corresponding to the region label value in rlblmap (the region label map at the finest level of detail of the segmentation hierarchy) and the row location corresponding to the segmentation hierarchy level (the $l^{th}$ row is the renumberings required to obtain the $(l+1)^{th}$ level of the segmentation hierarchy).

| | | |
|---|---|---|
| rnpixlist | (string) | Output region number of pixels list file name |

The region number of pixels list consists of the number of pixels (of data type "unsigned int") in each region stored as rows of values, with the column location (with counting starting at 1) corresponding to the region label value and the row location corresponding to the segmentation hierarchy level (with counting starting at 0).

| | | |
|---|---|---|
| oparam | (string) | Output parameter file name |

The output parameter file contains (in ASCII form) all the output parameters from RHSEG. This parameter file is formatted in the same way as the input parameter file for RHSEG and contains most of the same parameters. Additional parameters are the number of hierarchical segmentation levels (nb_levels) in the hierarchical segmentation output and the number of regions (level0_nregions) in the hierarchical segmentation with the finest segmentation detail. These additional parameter values are required to interpret the rnpixlist, regmerges, rmeanlist, rthreshlist and boundary_npix output files (see below).

The following parameters specify recommended, but optional, output files (no defaults):

| | | |
|---|---|---|
| rmeanlist | (string) | Output region mean list file name (default = {none}) |

The region mean list file is an optional output of RHSEG. This list consists of the region mean value (of data type "double") of each region stored as rows of values and groups of rows, with the column location (with counting starting at 1) corresponding to the region label value, the row location (in each row group) corresponding the spectral band and row group corresponding to the segmentation hierarchy level (with counting starting at 0).

| | | |
|---|---|---|
| rthreshlist | (string) | Output region maximum merge threshold list file name (default = {none}) |

The region maximum merge threshold list file an optional output of RHSEG. This list consists of the maximum merge threshold encountered in all merges involving each region. The values (of data type "double") are stored as rows of values, with the column location (with counting starting at 1) corresponding to the region label value and the row location corresponding to the segmentation hierarchy level (with counting starting at 0).

| | | |
|---|---|---|
| boundary_npix (string) | | Output region number of boundary pixels list file name (default = {none}) |

The region number of boundary pixels list is an optional output of RHSEG. This list consists of the number of boundary pixels in each region (of data type "unsigned int") stored as rows of values, with the column location (with counting starting at 1) corresponding to the region label value and the row location corresponding to the segmentation hierarchy level (with counting starting at 0).

| | | |
|---|---|---|
| boundary_map (string) | | Output hierarchical boundary map file name (default = {none}) |

The hierarchical boundary map is an optional output of RHSEG. The data values of this map are (of type unsigned char (byte))

| | |
|---|---|
| reg_std_dev (string) | Output region standard deviation value list file name<br>(default = {none},<br>ignored if spatial_wght = 0.0) |

The region standard deviation value list is an optional output of RHSEG. This list consists of the region's standard deviation value (of data type "double") stored as rows of values, with the column location (with counting starting at 1) corresponding to the region label value and the row location corresponding to the segmentation hierarchy level (with counting starting at 0).

The following parameters specify optional input files and associated parameters (with defaults, if any):

| | | |
|---|---|---|
| mask (string) | Input data mask file name | (default = {none}) |

The optional input data mask must match the input image data in number of columns and rows. Even if the input image data has more than one spectral band, the input data mask need only have one spectral band. If the input data mask has more than one spectral band, only the first spectral band is used and is assumed to apply to all spectral bands for the input image data. If the data value of the input data mask is not equal to mask_value (see the next parameter definition), the corresponding value of the input image data object is taken to be a valid data value. If the data value of the input data mask object is equal to mask_value, the corresponding value of the input image data object is taken to be invalid and a region label of "0" is assigned to that spatial location in the output region label map data. The input data mask data type is assumed to be "unsigned char."

| | |
|---|---|
| mask_value<br>(short unsigned int) | If input data mask file is provided, this is the value in the mask file that designates bad data. Otherwise this is the value in the input data that designates bad data. (If mask file provided, default = 0. Otherwise no default.) |
| rlblmap_in<br>(string) | Input region label map file name. Data type must be short unsigned int (default = {none}) |

The optional region label map must match the input image data in number of columns and rows. If provided, the image segmentation is initialized according to the input region label map instead of the default of each pixel as a separate region. Wherever a region label of "0" is given by the input region label map, the region labeling is assumed to be unknown and the region label map is initialized to one-pixel regions at those locations (except see rlblmap_mask_value below).

| | |
|---|---|
| rlblmap_mask_value<br>(short unsigned int) | If input region label map file is provided, this is the value in the region label map file that designates bad data. NOTE: The output region label map file uses the value zero (0) to designate bad data. (default = {none}) |

The following are optional parameters are recommended for variation by all users (defaults provided):

| | |
|---|---|
| spclust_wght (float) | Relative importance of spectral clustering versus region growing (spatial_wght ≧ 0.0, default = 1.0) |
| dissim_crit | (short unsigned int)Dissimilarity criterion"1-Norm,"<br>1. "2-Norm,"<br>2. "Infinity Norm,"<br>3. "(undefined),"<br>4. "(undefined),"<br>5. "Square Root of Band Sum Mean Squared Error,"<br>6. "Square Root of Band Maximum Mean Squared Error,"<br>7. "(undefined),"<br>8. "SAR Speckle Noise Criterion."<br>(default: 6 "Square Root of Band Sum Mean Squared Error") |

Criterion for evaluating the dissimilarity of one region from another.

Dissimilarity criteria 1, 2 and 3 are based on vector norms. The 1-Norm of the difference between the region mean vectors, $u_i$ and $u_j$, of regions $X_i$ and $X_j$, each with B spectral bands, is:

$$\|u_i - u_j\|_1 = \sum_{b=1}^{B} |\mu_{ib} - \mu_{jb}|, \tag{4a}$$

where $\mu_{ib}$ and $\mu_{jb}$ are the mean values for regions i and j, respectively, in spectral band b. The dissimilarity function for regions $X_i$ and $X_j$, based on the vector 1-Norm, is given by:

$$d_{1\text{-}Norm}(X_i, X_j) = \|u_i - u_j\|_1. \tag{4b}$$

The vector 2-Norm of the difference between the region mean vectors, $u_i$ and $u_j$, of regions $X_i$ and $X_j$ is:

$$\|u_i - u_j\|_2 = \left[\sum_{b=1}^{B} (\mu_{ib} - \mu_{jb})^2\right]^{1/2}, \tag{5a}$$

The dissimilarity function for regions $X_i$ and $X_j$, based on the vector 2-Norm, is given by:

$$d_{2\text{-}Norm}(X_i, X_j) = \|u_i - u_j\|_2. \tag{5b}$$

The vector ∞-Norm of the difference between the region mean vectors, $u_i$ and $u_j$, of regions $X_i$ and $X_j$ is:

$$\|u_i - u_j\|_\infty = \max(|\mu_{ib} - \mu_{jb}|, b=1, 2, \ldots, B), \tag{6a}$$

The dissimilarity function for regions $X_i$ and $X_j$, based on the vector ∞-Norm, is given by:

$$d_{\infty\text{-}Norm}(X_i, X_j) = \|u_i - u_j\|_\infty. \tag{6b}$$

Dissimilarity criteria 6 and 7 are based on minimizing the increase of mean squared error between the region mean image and the original image data (9) (10) (11). The sample estimate of the mean squared error for the segmentation of band b of the image X into R disjoint subsets $X_1, X_2, \ldots, X_R$ is given by:

$$MSE_b(X) = \frac{1}{N-1} \sum_{i=1}^{R} MSE_b(X_i), \quad (7a)$$

where $$MSE_b(X_i) = \sum_{x_p \in X_i} (\chi_{pb} - \mu_{ib})^2 \quad (7b)$$

is the mean squared error contribution for band b from segment $X_i$. Here, $x_p$ is a pixel vector (in this case, a pixel vector in data subset $X_i$), and $\chi_{pb}$ is the image data value for the $b^{th}$ spectral band of the pixel vector, $x_p$. A dissimilarity function based on a measure of the increase in mean squared error due to the merge of regions $X_i$ and $X_j$ is given by:

$$d_{BSMSE}(X_i, X_j) = \sum_{b=1}^{B} \Delta MSE_b(X_i, X_j), \quad (8a)$$

where $$\Delta MSE_b(X_i, X_j) = MSE_b(X_i \cup X_j) - MSE_b(X_i) - MSE_b(X_j). \quad (8b)$$

BSMSE refers to "band sum MSE." Instead of summing over the bands in (7a) one could take the maximum over the spectral bands, resulting in a "band maximum MSE:"

$$d_{BMMSE}(X_i, X_j) = \max\{\Delta MSE_b(X_i, X_j), b=1, 2, \ldots, B\}. \quad (8c)$$

Using (7b) and exchanging the order of summation, (8b) can be manipulated to produce an efficient dissimilarity function based on aggregated region features:

$$\Delta MSE_b(X_i, X_j) = \quad (9a)$$

$$\left( \sum_{x_p \in X_{ij}} [\chi_{pb} - \mu_{ijb}]^2 - \sum_{x_p \in X_i} [\chi_{pb} - \mu_{ib}]^2 - \sum_{x_p \in X_j} [\chi_{pb} - \mu_{jb}]^2 \right) =$$

$$\left( \sum_{x_p \in X_i} [(\chi_{pb} - \mu_{ijb})^2 - (\chi_{pb} - \mu_{ib})^2] + \right.$$

$$\left. \sum_{x_p \in X_j} [(\chi_{pb} - \mu_{ijb})^2 - (\chi_{pb} - \mu_{jb})^2] \right) =$$

$$\left( \sum_{x_p \in X_i} [\chi_{pb}^2 - 2\chi_{pb}\mu_{ijb} + \mu_{ijb}^2 - \chi_{pb}^2 + 2\chi_{pb}\mu_{ib} - \mu_{ib}^2] + \right.$$
$$\left. \sum_{x_p \in X_j} [\chi_{pb}^2 - 2\chi_{pb}\mu_{ijb} + \mu_{ijb}^2 - \chi_{pb}^2 + 2\chi_{pb}\mu_{jb} - \mu_{jb}^2] \right) =$$

$$\left( -2\mu_{ijb} \sum_{x_p \in X_i} \chi_{pb} + n_i \mu_{ijb}^2 + 2\mu_{ib} \sum_{x_p \in X_i} \chi_{pb} - n_i \mu_{ib}^2 \right.$$
$$\left. -2\mu_{ijb} \sum_{x_p \in X_j} \chi_{pb} + n_j \mu_{ijb}^2 + 2\mu_{jb} \sum_{x_p \in X_j} \chi_{pb} - n_j \mu_{jb}^2 \right) =$$

$$\left( -2n_i \mu_{ib}\mu_{ijb} + n_i \mu_{ijb}^2 + 2n_i \mu_{ib}^2 - n_i \mu_{ib}^2 \right.$$
$$\left. -2n_j \mu_{jb}\mu_{ijb} + n_j \mu_{ijb}^2 + 2n_j \mu_{jb}^2 - n_j \mu_{jb}^2 \right) =$$

$$n_i(\mu_{ib}^2 - 2\mu_{ib}\mu_{ijb} + \mu_{ijb}^2) + n_j(\mu_{jb}^2 - 2\mu_{jb}\mu_{ijb} + \mu_{ijb}^2) =$$

$$n_i(\mu_{ib} - \mu_{ijb})^2 + n_j(\mu_{jb} - \mu_{ijb})^2.$$

where $\mu_{ijb}$ is the mean value for the $b^{th}$ spectral band of the mean vector, $u_{ij}$, of region represented by $X_{ij} = X_i \cup X_j$.

Since $$\mu_{ijb} = \frac{n_i \mu_{ib} + n_j \mu_{jb}}{n_i + n_j}, \quad (9b)$$

an alternate form for Equation (9a) is:

$$\Delta MSE_b(X_i, X_j) = n_i(\mu_{ib} - \mu_{ijb})^2 + n_j(\mu_{jb} - \mu_{ijb})^2 = \quad (9c)$$

$$n_i \mu_{ijb}^2 - 2n_i \mu_{ib}\mu_{ijb} + n_i \mu_{ib}^2 + n_j \mu_{ijb}^2 - 2n_j \mu_{jb}\mu_{ijb} + n_j \mu_{jb}^2 =$$

$$n_i \mu_{ib}^2 + n_j \mu_{jb}^2 - 2(n_i \mu_{ib} + n_j \mu_{jb})\mu_{ijb} +$$

$$(n_i + n_j)\mu_{ijb}^2 \frac{1}{(n_i + n_j)}[(n_i + n_j)(n_i \mu_{ib}^2 + n_j \mu_{jb}^2) -$$

$$2(n_i \mu_{ib} + n_j \mu_{jb})^2 + (n_i \mu_{ib} + n_j \mu_{jb})^2] =$$

$$\frac{1}{(n_i + n_j)}[(n_i + n_j)(n_i \mu_{ib}^2 + n_j \mu_{jb}^2) - (n_i \mu_{ib} + n_j \mu_{jb})^2] =$$

$$\frac{1}{(n_i + n_j)}(n_i^2 \mu_{ib}^2 + n_i n_j \mu_{jb}^2 + n_i n_j \mu_{ib}^2 +$$

$$n_j^2 \mu_{jb}^2 - n_i^2 \mu_{ib}^2 - 2n_i n_j \mu_{ib}\mu_{jb} - n_j^2 \mu_{jb}^2) =$$

$$\frac{n_i n_j}{(n_i + n_j)}(\mu_{jb}^2 + \mu_{ib}^2 - 2\mu_{ib}\mu_{jb}) = \frac{n_i n_j}{(n_i + n_j)}(\mu_{ib} - \mu_{jb})^2.$$

Combining Equations (8a) and (9c), $$d_{BSMSE}(X_i, X_j) = \frac{n_i n_j}{(n_i + n_j)} \sum_{b=1}^{B} (\mu_{ib} - \mu_{jb})^2. \quad (10a)$$

Similarly combining Equations (8c) and (9c), $$d_{BMMSE}(X_i, X_j) = \frac{n_i n_j}{(n_i + n_j)} \max\{(\mu_{ib} - \mu_{jb})^2 : b = 1, 2, \ldots, B\}. \quad (10b)$$

The dimensionality of the $d_{BSMSE}$ and the $d_{BMMSE}$ dissimilarity criteria is equal to the square of the dimensionality of the image pixel values, while the dimensionality of the vector norm based dissimilarity criteria is equal to the dimensionality of the image pixel values. To keep the dissimilarity criteria dimensionalities consistent, HSEG uses the square root of these dissimilarity criteria. The "Square Root of Band Sum Mean Squared Error" criterion is:

$$d_{BSMSE}^{1/2}(X_i, X_j) = \left[ \frac{n_i n_j}{(n_i + n_j)} \sum_{b=1}^{B} (\mu_{ib} - \mu_{jb})^2 \right]^{1/2}, \quad (11a)$$

and the "Square Root of Band Sum Maximum Squared Error" criterion is:

$$d_{BMMSE}^{1/2}(X_i, X_j) = \left[ \frac{n_i n_j}{(n_i + n_j)} \max\{(\mu_{ib} - \mu_{jb})^2 : b = 1, 2, \ldots, B\} \right]^{1/2} \quad (11b)$$

Dissimilarity criterion 9 is based on the "SAR Speckle Noise Criterion" from Beaulieu. The criterion is:

$$d_{SAR}(X_i, X_j) = [n_i n_j(n_i + n_j)]^{1/2} \sum_{b=1}^{B} \frac{|\mu_{ib} - \mu_{jb}|}{(n_i \mu_{ib} + n_j \mu_{jb})}, \quad (12)$$

NOTE: Other dissimilarity criterion can be included as additional options without changing the nature of the RHSEG implementation.

| | |
|---|---|
| chk_nregions (short unsigned int) | Number of regions at which convergence factor checking is initiated ($2 \leq$ chk_nregions $< 65535$, default = 64) |
| convfact (float) | Convergence factor ($1 \leq$ convfact $\leq 100.0$, default = 1.01) |

The following optional parameters may need to be modified depending on your operating system (defaults provided):

| | |
|---|---|
| byteswap_in (short unsigned int) | Flag specifying byteswapping for input data (1 (true) or 0 (false), default = 0) |
| byteswap_out (short unsigned int) | Flag specifying byteswapping for output data (1 (true) or 0 (false), default = 0) |

The default values should be used for the following optional parameters, except in special circumstances (defaults provided):

| | |
|---|---|
| spatial_wght (float) | Weight for standard deviation spatial feature (spatial_wght $\geq 0.0$, default = 0.0) |

Setting spatial_wght=1.0 weights the spatial feature equally with the spectral band features, spatial_wght<1.0 weights the spatial feature less and spatial_wght>1 weights the spatial feature more. If D is the dissimilarity function value before combination with the spatial feature value, the combined dissimilarity function value (comparing regions i and j), $D^c$, is:

$$D^c = D + \text{spatial\_wght} * |sf_i - sf_j| \quad (13)$$

where $sf_i$ and $sf_j$ are the spatial feature values for regions i and j, respectively.

The spatial feature employed is the spectral band maximum region standard deviation. For regions consisting of 2 or more pixels, the region standard deviation for spectral band b of region i is:

$$\sigma_{ib} = \sqrt{\frac{1}{n_i - 1} \sum_{x_p \in X_i} (\chi_{pb} - \mu_{ib})^2} \quad (14)$$

$$= \sqrt{\frac{1}{n_i - 1} \left[ \sum_{x_p \in X_i} (\chi_{pb})^2 - n_i(\mu_{ib})^2 \right]},$$

where $n_i$ is the number of pixels in the region and $\mu_{ib}$ is the region mean for spectral band b of region i:

$$\mu_{ib} = \frac{1}{n_i} \sum_{x_p \in X_i} \chi_{pb}.$$

The spatial feature value for region i is then defined as:

$$sf_i = \sigma_i = B * \max\{\sigma_{ib} : b = 1, 2, \ldots, B\} \quad (15)$$

where B is the number of spectral bands.

The region standard deviation is not defined for regions consisting of only one pixel. Further, the region standard deviation as calculated by equation (14) can only be considered a rough estimate for small regions (say, regions less than 9 pixels in size). Thus, if one of the regions being compared consists of less than 9 pixels, the spatial_wght factor is modified by a std_dev_factor as follows:

$$\text{spatial\_wght}' = \text{std\_dev\_factor} * \text{spatial\_wght}, \quad (16a)$$

where $$\text{std\_dev\_factor} = (\text{min\_npix} - 1.0) / 8.0, \quad (16b)$$

and min_npix is the number of pixels in the smallest of the two regions being compared. Note that for min_npix=1, std_dev_factor=0.0. Thus, std_dev_factor serves to gradually phase in the standard deviation spatial feature as the regions get larger.

| | |
|---|---|
| conn_type (short unsigned int) | Neighbor connectivity type (2-spatial dimensions) |
| | 1. "Four Nearest Neighbors," 2. "Eight Nearest Neighbors," 3. "Twelve Nearest Neighbors," 4. "Twenty Nearest Neighbors," 5. "Twenty-Four Nearest Neighbors," (default: 2 "Eight Nearest Neighbors") | based on the following neighborhood chart, where the focal pixel is marked "X":

| 21 | 15 | 11 | 17 | 23 |
|----|----|----|----|----|
| 13 | 5  | 3  | 7  | 19 |
| 9  | 1  | X  | 2  | 10 |
| 20 | 8  | 4  | 6  | 14 |
| 24 | 18 | 12 | 16 | 22 |

Using this chart, N Nearest Neighbors include pixels 1, 2, ... N.

For 1-spatial dimension data, cases 1 and 2 degenerate to "Two Nearest Neighbors" and cases 3, 4 and 5 degenerate to "Four Nearest Neighbors," according to the following neighborhood chart:

| 3 | 1 | X | 2 | 4 |
|---|---|---|---|---|

| | |
|---|---|
| normind (short unsigned int) | Image normalization type |
| | 1. "No Normalization," 2. "Normalize Across Bands," 3. "Normalize Bands Separately" (default: 2 "Normalize Across Bands") |

Let $\chi_{pb}$ be the original value for the $p^{th}$ pixel (out of N pixels) in the $b^{th}$ band (out of B bands). The sample mean and sample variance of the $b^{th}$ band are $$\mu_b = \frac{1}{N}\sum_{p=1}^{N} \chi_{pb} \text{ and } \sigma_b^2 = \frac{1}{N-1}\sum_{p=1}^{N}(\chi_{pb} - \mu_b)^2, \quad (17)$$

respectively. The following transformation of the data, $\chi_{pb}$, will produce image data, $\xi_{pb}$, with mean, M, and variance, $\Sigma$:

$$\xi_{pb} = \left[\frac{\Sigma}{\sigma_b}(\chi_{pb} - \mu_b)\right] + M = \sum_b{}' \chi_{pb} + M_b', \text{ where} \quad (18)$$

$$\sum_b{}' = \frac{\Sigma}{\sigma_b} \text{ and } M_b' = M - \sum \frac{\mu_b}{\sigma_b}. \quad (19)$$

Usually, the data is normalized so that $\Sigma^2(=\Sigma)=1$, and M=0.

As written above, the normalization is applied to each spectral band separately. It can also be defined to apply equally across all spectral bands. For this case, use $\sigma=\max\{\sigma_b:b=1, 2, \ldots, B\}$ in (18) and (19). However, this type of normalization will produce the same hierarchical segmentation result as no normalization at all: the dissim_val's will change, but the tratio values will end up being the same (see step 11 of the "HSEG Basic Algorithm Description" described in connection with FIG. 8.

| rnb_levels | (short unsigned int) | Number of recursive levels (1 ≤ rnb_levels < 255, default calculated) |

The number of recursive levels. The default is calculated such that the number of data points in the subsections of data processed at recursion level rnb_levels are no more that 2048 data points. The number of columns and rows at recursion level rnb_levels is sub_ncols=ncols/$2^{rnb\_levels-1}$ and sub_nrows=nrows/$2^{rnb\_levels-1}$.

| min_nregions (unsigned int) | Number of regions for convergence in recursive stages (0 < min_nregions < 65535, default calculated) |

If not specified, the default is calculated to be min_nregions=sub_ncols*sub_nrows/4 (for sub_ncols and sub_nrow see the rnb_levels parameter).

| spclust_start (short unsigned int) | Number of regions at and below which spectral clustering is utilized. Otherwise, the spectral clustering step is skipped. (0 ≤ spclust_start < 65535, default calculated) |

The default for spclust_start is calculated such that spectral clustering is utilized only part of the time when spclust_wght>0.0. If spclust_wght=0.0, spclust_start=0. Otherwise, spclust_start=2*min_nregions.

| gdissim_crit (short unsigned int) | Global dissimilarity criterion 1. "1-Norm," 2. "2-Norm," 3. "Infinity Norm," 4. "(undefined)," 5. "(undefined)," 6. "Square Root of Band Sum Mean Squared Error," 7. "Square Root of Band Maximum Mean Squared Error," 8. "(undefined)," 9. "SAR Speckle Noise Criterion." (default = {none}) |

Criterion for evaluating the quality of the image segmentations based on the global dissimilarity of the region mean image versus the original image data.

The global dissimilarity criteria 1, 2 and 3 are based on vector norms. The global dissimilarity function, based on the vector 1-Norm, for the R region segmentation of the N pixel data set X is given by:

$$D_{1\text{-}Norm}(X) = \frac{1}{N}\sum_{i=1}^{R}\sum_{x_p \in X_i}\|x_p - u_i\|_1. \quad (20)$$

The global dissimilarity function, based on the vector 2-Norm, for the R region segmentation of the N pixel data set X is given by:

$$D_{2\text{-}Norm}(X) = \frac{1}{N}\sum_{i=1}^{R}\sum_{x_p \in X_i}\|x_p - u_i\|_2. \quad (21)$$

The global dissimilarity function, based on the vector ∞-Norm, for the R region segmentation of the N pixel data set X is given by:

$$D_{\infty\text{-}Norm}(X) = \frac{1}{N}\sum_{i=1}^{R}\sum_{x_p \in X_i}\|x_p - u_i\|_\infty. \quad (22)$$

The global dissimilarity criteria 6 and 7 are based on the square root of the mean squared error between the region mean image and the original image data. The global dissimilarity criterion "Square Root of Band Sum Mean Squared Error" is:

$$D_{BSMSE}^{\frac{1}{2}}(X) = \left[\frac{1}{(N-1)}\sum_{i=1}^{R}\sum_{x_p \in X_i}\sum_{b=1}^{B}(\chi_{pb} - \mu_{ib})^2\right]^{\frac{1}{2}}. \quad (23)$$

The global dissimilarity criterion "Square Root of Band Maximum Mean Squared Error" is:

$$D_{BMMSE}^{\frac{1}{2}}(X) = \left[\frac{1}{(N-1)}\sum_{i=1}^{R}\sum_{x_p \in X_i} \max\{(\chi_{pb} - \mu_{ib})^2 : b = 1, 2, \cdots, B\}\right]^{\frac{1}{2}}. \quad (24)$$

Dissimilarity criterion 9 is based on the "SAR Speckle Noise Criterion" from M. Beaulieu. The global criterion is:

$$D_{SAR}(X) = \frac{1}{N}\sum_{i=1}^{R}\sum_{x_p \in X_i}\sum_{b=1}^{B} |\chi_{pb} - \mu_{ib}|. \quad (25)$$

| | |
|---|---|
| min_npixels_pct (float) | Number of pixels for a region as a percentage of the total number of pixels in a processing window below which merging is accelerated. For regions smaller than this minimum number of pixels, the dissimilarity function is adjusted to favor merging. (0.0 < min_npixels_pct < 100.0, default = 0.0) |

This parameter is used to calculate min_pixels as follows:

min_npixels=⌊npixels*min_npixels_*pct*/100.0⌋,     (26a)

where npixels is the number of pixels in the current section of data being processed. The value of min_npixels is then used to calculate a merge acceleration factor, factor, which is multiplied times the dissimilarity criterion value. If small_npix is the number of pixels in the smaller of the two regions being compared, factor=1.0 if small_npix≧min_npixels and factor=1.0−((min_npixels−small_npix)/min_npixels),     (26b)

otherwise.

| | |
|---|---|
| seam_threshold_factor (float) | This threshold factor is used in determining whether a region found across a processing window seam is to be considered in determining whether a pixel is to be split out of its current region. (1.0 <= seam_threshold_factor, default = 1.5. If threshold_factor = 1.0, no regions are selected by this method) |

During the processing window elimination process, a "candidate region label" set is accumulated for use in considering whether or not a pixel is to be split out of its current region. A candidate region is a region that either may contain pixels that should be split out and possibly be assigned to a different region, or is a region to which a split out pixel may be assigned to. Consider the data points that are in the pairs of rows and columns along the seam between the data quadrants reassembled in step 2 of the RHSEG algorithm. For each of these pixels calculate the dissimilarity between the pixel and its current region (own_region_dissim), and calculate the dissimilarity between the pixel and the region of the pixel across the seam (other_region_dissim). If own_region_dissim> seam_threshold_factor*other_region_dissim, add the region label of the region of the pixel across the seam to the "candidate region label" set of the region the pixel belongs to.

| | |
|---|---|
| region_threshold_factor (float) | This threshold factor is used in determining which regions are to be considered in determining whether a pixel is to be split out of its current region. (1.0 < threshold_factor, default = 1.5. If region_threshold_factor = 1.0, no regions are selected by this method) |

During the processing window elimination process, a "candidate region label" set is accumulated for use in considering whether or not a pixel is to be split out of its current region. Compare each region to every other region. If the dissimilarity between a pair of regions is less than region_threshold_factor*max_threshold, add each region label to the "candidate region label" set for the other region. NOTE: max_threshold is the maximum merging threshold encountered in the previous merging iterations.

| | |
|---|---|
| split_pixels_factor (float) | Pixel splitting factor. A pixel will be split out from its current region if it is this factor more similar to another region than it is to its current region. (0.0 ≦= split_pixels_factor, default = 1.5. No pixel splitting is performed if split_pixels_factor < 1.0.) |

For each region with a non-empty "candidate region label" set, compute the dissimilarity of each pixel in that region to its current region (own_region_dissim) and to each region in the region's "candidate region label" set (other_region_dissim). If a pixel is found to have own_region_dissim>split_pixels_factor*other_region_dissim, the pixel is split out from its current region.

| | |
|---|---|
| conv_nregions(short unsigned int) | Number of regions for final convergence (0 < conv_nregions < 65535, default = 2) |

When spclust_wght>0.0, the following optional parameters may be used to output information on closed connected regions (no defaults, ignored if spclust_wght=0.0):

| | |
|---|---|
| nb_conn_regons (string) | Output number of connected regions list file |
| conn_oparam (string) | Connected regions output parameter file name (ignored if conn_rlblmap and conn_rnpixlist are not provided) |

Similar to the output parameter file oparam.

| | |
|---|---|
| conn_rlblmap (string) | Output connected region label map data file name |

Similar to rlblmap, but with closed connected regions.

| | | |
|---|---|---|
| conn_regmerges (string) | | Output connected region label map merges list file name |

Similar to regmerges, but for closed connected regions.

| | | |
|---|---|---|
| conn_rnpixlist (string) | | Output connected region number of pixels list file name |

Similar to rnpixlist, but for closed connected regions.

| | | |
|---|---|---|
| conn_rmeanlist (string) | | Output connected region mean list file name |

Similar to rmeanlist, but for closed connected regions.

| | | |
|---|---|---|
| conn_rthreshlist (string) | | Output connected region maximum merge threshold list file name |

Similar to rthreshlist, but for closed connected regions.

| | | |
|---|---|---|
| conn_boundary_npix (string) | | Output connected region number of boundary pixels list file name |

Similar to boundary_npix, but for closed connected regions.

| | | |
|---|---|---|
| conn_reg_std_dev (string) | | Output connected region standard deviation list file name |

Similar to reg_std_dev, but for closed connected regions.

The following optional parameters control the run-time screen and log file outputs:

| | | |
|---|---|---|
| debug | (short unsigned int) | Debug option (debug ≧ 0, default = 1) |

Must be specified if debug>0 (ignored if debug=0):

| | | |
|---|---|---|
| log_file | (string) | Output log file |

At a minimum (for debug=1), the output log file records program parameters and the number of regions and maximum merge ratio value for each level of the region segmentation hierarchy.

The parameters that have the most effect on the nature of the segmentation results are spclust_wght, dissim_crit, chk_nregions and convfact. The default values are recommended for the other optional parameters for routine use of HSEG and RHSEG, with the exception that specification of the output file name parameters regmerges, rthreshlist, boundary_npix and boundary_map is also recommended. In addition, the file name parameter rmeanlist is recommended when the number of spectral bands is less than 10 or so. Of course, if some input data elements are invalid, the some method of data masking should also be employed.

The following paragraphs give some guidance on the setting of the spclust_wght, dissim_crit, chk_nregions and convfact parameters:

spclust_wght: The user may want to vary the value of spclust_wght to modify the overall nature of the segmentation results. For spclust_wght=0.0, obtains relatively coherent closed connected regions. For spclust_wght=1.0, obtains relatively variated regions consisting of possibly several spatially disjoint subsections. For other values of spclust_wght obtains results intermediate the spclust_wght=0.0 and spclust_wght=1.0 results.

dissim_crit: The user may also want to vary the value of dissim_crit to modify the overall nature of the segmentation results. The different dissimilarity criterion will result in different merge ordering. NOTE: If any of the vector norm dissimilarity criterion is chosen (selections 1, 2 or 3), the user may also want to specify the value of min_npixels_pct (small values in the range of 0.1 to 1.0 are suggested).

chk_nregions: The user may want to vary the value of chk_nregions to vary the level of segmentation detail in the most detailed level of the segmentation hierarchy. Higher values will increase the detail (the segmentation will have more regions) and lower values will decrease the detail (the segmentation will have fewer regions).

convfact: The user may want to vary the value of convfact to control the number of hierarchical segmentation levels contain in the final segmentation hierarchy. Lower values of convfact will produce more segmentation levels and higher values of convfact will produce fewer segmentation levels. Too high of a value for convfact will produce only two hierarchical levels: one with chk_nregions number of regions and one with conv_nregions number of regions.

Varying the other optional parameter values away from the default values requires a thorough understanding of the inner workings of the software implementation of the HSEG and RHSEG algorithms.

This disclosure has been written in a general way as to include alternate embodiments of the algorithms in software. Varying the parameters will bring about various alternate embodiments of the innovation.

The extension of the basic RHSEG algorithm to 3-spatial dimensions is conceptually straightforward. One just needs to deal in data "voxels" instead of "pixels," extend the definition of conn-type to include 3-spatial dimension neighborhoods, and recursively divide the data into eight equal sections (halving each spatial dimension) rather than four.

Concerning conn_type:

| | | |
|---|---|---|
| conn_type | (short unsigned int) | Neighbor connectivity type (3-spatial dimensions) 1. "Six Nearest Neighbors," 2. "Eighteen Nearest Neighbors," 3. "Twenty-Six Nearest Neighbors," |

For 2-spatial dimensions, we defined neighbors based on the following neighborhood chart, where the focal pixel is marked "X":

| | | | | |
|---|---|---|---|---|
| 21 | 15 | 11 | 17 | 23 |
| 13 | 5 | 3 | 7 | 19 |
| 9 | 1 | X | 2 | 10 |
| 20 | 8 | 4 | 6 | 14 |
| 24 | 18 | 12 | 16 | 22 |

Using this chart, N Nearest Neighbors include pixels 1, 2, . . . N for 2-spatial dimension data. A similar chart could be developed for 3-spatial dimensions, but printing would require 3-dimensional plotting. It is easier to present a table of values. For 2-spatial dimensions, the table corresponding to above 2-spatial dimension chart, for up to Eight Nearest Neighbors, is:

| Neighbor Number | nbcol | nbrow |
|---|---|---|
| 1 | col − 1 | row |
| 2 | col + 1 | row |
| 3 | col | row − 1 |
| 4 | col | row + 1 |
| 5 | col − 1 | row − 1 |
| 6 | col + 1 | row + 1 |
| 7 | col + 1 | row − 1 |
| 8 | col − 1 | row + 1 | where the focal pixel is at location (col,row), and nbcol is the neighboring pixel column location and nbrow is the neighboring pixel row location.

The corresponding chart for 3-spatial dimensions, for up to Twenty-Six Nearest Neighbors, is given on the next page. In this chart, the focal pixel is at location (col, row, depth), nbcol is the neighboring voxel column location, nbrow is the neighboring voxel row location and nbdepth is the neighboring voxel depth location. Note that the equivalent of Eight Nearest Neighbors (the default) in 2-spatial dimensions is Twenty-Six Nearest Neighbors in 3-spatial dimensions.

The extension to 3-spatial dimensions of RHSEG is also conceptually straightforward. The seams between the data sections that are reassembled after processing at the previous level of recursion now become pairs of surfaces rather than pairs of lines.

| Neighbor Number | nbcol | nbrow | nbdepth |
|---|---|---|---|
| 1 | col − 1 | row | depth |
| 2 | col + 1 | row | depth |
| 3 | col | row − 1 | depth |
| 4 | col | row + 1 | depth |
| 5 | col | row | depth − 1 |
| 6 | col | row | depth + 1 |
| 7 | col − 1 | row − 1 | depth |
| 8 | col + 1 | row + 1 | depth |
| 9 | col + 1 | row − 1 | depth |
| 10 | col − 1 | row + 1 | depth |
| 11 | col | row − 1 | depth − 1 |
| 12 | col | row + 1 | depth + 1 |
| 13 | col | row + 1 | depth − 1 |
| 14 | col | row − 1 | depth + 1 |
| 15 | col − 1 | row | depth − 1 |
| 16 | col + 1 | row | depth + 1 |
| 17 | col + 1 | row | depth − 1 |
| 18 | col − 1 | row | depth + 1 |
| 19 | col − 1 | row − 1 | depth − 1 |
| 20 | col + 1 | row + 1 | depth + 1 |
| 21 | col + 1 | row + 1 | depth − 1 |
| 22 | col + 1 | row − 1 | depth + 1 |
| 23 | col + 1 | row − 1 | depth − 1 |
| 24 | col − 1 | row + 1 | depth + 1 |
| 25 | col − 1 | row + 1 | depth − 1 |
| 26 | col − 1 | row − 1 | depth + 1 |

The extension of the parallel implementation of RHSEG to 3-spatial dimensions is also straightforward conceptually. The number of processors utilized by the 3-spatial dimension implementation is numprocs=$8^{inb\_levels-1}$. At inb_levels=2, numprocs=8, at inb_levels=3, numprocs=64, and at inb_levels=4, numprocs=512.

At program initialization, the input data would again be parceled out to numprocs processors, and each processor would independently process each of the numprocs data sections. Again similar to the 2-spatial dimension version, upon completion of processing at recursive levels rnb_levels through inb_levels, the 3-spatial dimension version would transfer its results to the appropriate processor at recursive level inb_levels−1.

The parallel implementation scheme for the 3-spatial dimension version of RHSEG could be charted similarly to FIG. 14, except that each recursive level splits eight ways rather than four ways.

While the parallel implementation of the modified version of RHSEG is noted to be conceptually straightforward, the amount of detail that needs to be kept track of by the program is increased substantially, complicating the programming task substantially.

All publications, patents, and patent documents are incorporated by reference herein as though individually incorporated by reference Although preferred embodiments of the present invention have been disclosed in detail herein, it will be understood that various substitutions and modifications may be made to the disclosed embodiment described herein without departing from the scope and spirit of the present invention as recited in the appended claims.

REFERENCES

Sanghoon Lee, Kwae-Hi Lee and Choe Kim, "Efficient multistage system for unsupervised classification and its application of KOMPSAT-I imagery," *Proc. of the 2000 International Geoscience and Remote Sensing Symposium*, Honolulu, Hi., Jul. 24-28, 2000.

Sanghoon Lee, *An Unsupervised Hierarchical Clustering Image Segmentation and an Adaptive Image Reconstruction System for Remote Sensing*, Ph. D. Thesis, The University of Texas at Austin, 1990.

J. M. Beaulieu and M. Goldberg, "Hierarchy in picture segmentation: A stepwise optimization approach," *IEEE Trans. on Pattern Analysis and Machine Intelligence*, Vol. 11, No. 2, pp. 150-163, February 1989.

K. Haris, S. N. Efstratiadis, N. Maglayeras and A. K. Katsaggelos, "Hybrid image segmentation using watersheds and fast region merging," *IEEE Transactions on Image Processing*, Vol. 7, No. 12, pp. 1684-1699, December 1998.

J. C. Tilton, "Image segmentation by iterative parallel region growing with applications to data compression and image analysis," *Proceedings of the 2nd Symposium on the Frontiers of Massively Parallel Computing*, Fairfax, Va., pp. 357-360, Oct. 10-12, 1988.

J.-M. Beaulieu, "Utilisation of contour criteria in micro-segmentation of SAR images," *International Journal of Remote Sensing*, Vol. 25, No. 17, pp. 3497-3512, Sep. 10, 2004.

J. C. Tilton and S. C. Cox, "Segmentation of remotely sensed data using parallel region growing," *Digest of the 1983 International Geoscience and Remote Sensing Symposium*, San Francisco, Calif., pp. 9.1-9.6, Aug. 31-Sep. 2, 1983.

J. C. Tilton, "Experiences using TAE-Plus command language for am image segmentation program interface,"*Proceedings of the TAE Ninth Users' Conference*, New Carrollton, Md., pp. 297-312, 1991.

A. Baraldi and F. Parmiggiani, "Single linkage region growing algorithms based on vector degree of match," *IEEE Transactions on Geoscience and Remote Sensing*, vol. 34, no. 1, pp. 137-148, January 1996.

R. L. Kettig and D. A. Landgrebe, "Computer classification of remotely sensed multispectral image data by extraction and classification of homogeneous objects," *LARS Information Note* 050975, Laboratory for Applications of Remote Sensing, Purdue University, West Lafayette, Ind., 1975.

R. L. Kettig and D. A. Landgrebe, "Automatic boundary and sample classification of remotely sensed multispectral data," *LARS Information Note* 041773, The Laboratory for Applications of Remote Sensing, Purdue Univ., W. Lafayette, Ind., 1973.

G. W. Snedecor and W. G. Cochran, *Statistical Methods*, The Iowa State University Press, Ames, Iowa, 1967.

L. Sachs, *Applied Statistics*, Springer-Verlag, New York, N.Y., 1982.

B. R. Frieden, "Image enhancement and restoration," in *Picture Processing and Digital Filtering*, ed. T. S. Huang, Springer-Verlag, New York, 1975.

I claim:

1. A computer implemented singleband multispectral remotely sensed imagery data for earth science observation method of eliminating processing window artifacts that occur in segmentation of data having spatial characteristics through a recursive approximation of a segmentation process using a computer to perform the steps of:: (a) recursively dividing the data into subsections, each subsection having a boundary and no more than a predetermined number of data elements, designating as contagious each new region that is adjacent to a data subsection boundary; (b) calculating a dissimilarity criterion between each new region and each other spatially adjacent region; (c) if the dissimilarity criterion between one new region and another spatially adjacent region is less than or equal to a maximum merging threshold and if the one new region is not contagious, merge the one new region with a predetermined spatially adjacent region, further including if the predetermined number of merged regions in a data subsection has not been reached, remove a contagious designation from all regions in that data subsection and compute a new dissimilarity criterion between each new region and each other spatially adjacent region and each candidate region: (d) repeat step (c) until a predetermined number of merged regions is attained or until no further merges can occur, (e) compare each region to every other region through said dissimilarity criterion, and if said dissimilarity between a pair of regions is below a predetermined value, designate each of the pair of regions a candidate region of the other and, further including for each pixel designated as a split pixel, associate candidate regions to the pixel equal to the candidate regions associated with the region originally assigned to the pixel, adding the original region assignment of the pixel to the candidate regions for the pixel, and the split pixel out of the region to which the pixel was originally assigned.

2. The computer implemented singleband multispectral remotely sensed imagery data for earth science observation method of eliminating processing window artifacts according to claim 1, further including if the compared pair of regions has dissimilarity less than a spatial weighting factor less than the maximum merging threshold, merge the pair of regions.

3. The computer implemented singleband multispectral remotely sensed imagery data for earth science observation method of eliminating processing window artifacts according to claim 2, further including returning a segmentation result to a calling recursive level program element.

4. The computer implemented singleband multispectral remotely sensed imagery data for earth science observation method of eliminating processing window artifacts according to claim 1, further including, for each region with one or more candidate regions, computing a dissimilarity criterion for each pixel to the region and to each of the candidate regions.

5. The computer implemented singleband multispectral remotely sensed imagery data for earth science observation method of eliminating processing window artifacts according to claim 4, further including if the dissimilarity of the pixel to the region of the pixels across the boundary, when weighted by a predetermined factor, is less than the dissimilarity of the pixel to its own region, then designate each of the pair of regions as a candidate region of the other.

6. The computer implemented singleband multispectral remotely sensed imagery data for earth science observation method of eliminating processing window artifacts according to claim 5, further including for each region with one or more candidate regions, compute a dissimilarity criterion for each pixel to the region and to each of the candidate regions, and if the dissimilarity criterion for a pixel is less than the dissimilarity criterion for one of the candidate regions when weighted by a predetermined factor, then designate said pixel as a split pixel.

7. The computer implemented singleband multispectral remotely sensed imagery data for earth science observation method of eliminating processing window artifacts according to claim 1, wherein the dissimilarity criterion is selected from the group of vector norms, the square root of band sum mean squared error, the square root of band maximum squared error, and the SAR Speckle Noise Criterion.

8. A computer implemented singleband multispectral remotely sensed imagery data for earth science observation method of eliminating processing window artifacts occurring in a segmentation of data with spatial characteristics comprising the steps of: (a) implementing a recursive segmentation algorithm on the data thereby assigning data pixels comprising the data into regions, in a fashion that divides the data into subsections; (b) for pixels along a seam between data subsections determining whether a first pixel is within a predetermined criteria to its current region or to the region of a second pixel across the seam; (c) if the first pixel is determined to be within a predetermined criteria to the region of the second pixel across the seam by a predetermined threshold factor, then the second pixels region is designated as a candidate region for assignment of the first pixel; (d) comparing a first region to every other region within a predetermined threshold and if the similarity between a pair of regions exists then designating each of the pair of regions as a candidate region of the other; (e) for each first region with a candidate region, computing the similarity of pixels in the first region to the first region and to candidate regions of the first region; (f) if a pixel in the first region is within a predetermined criteria to a candidate region, designating said pixel as a split pixel; (g) if merges between spatially adjacent and non-adjacent regions have equal importance then merging the pixels designated as split pixels into the regions to which those split pixels are within said predetermined criteria: (h) if merges between spatially adjacent regions have importance within said predetermined criteria than non-adjacent regions then designating each split pixel adjacent to a seam as contagious; (i) if a first split pixel not designated as contagious is within a predetermined criteria to a candidate region not designated as contagious, merging the first split pixel into that most similar candidate region; (j) if either the first split pixel or the pixel within a predetermined criteria candidate region is designated as contagious, then designating both as contagious and deferring consideration of their merger at the present level of recursion; (k) returning to step (b) at a higher level of recursion until the top recursion level or a small number of regions is achieved.

9. The computer implemented singleband multispectral remotely sensed imagery data for earth science observation method of claim 8 wherein the recursive segmentation algorithm includes a region growing approach.

10. The computer implemented singleband multispectral remotely sensed imagery data for earth science observation method of claim 8 wherein the recursive segmentation algorithm includes a special clustering approach.

11. The computer implemented singleband multispectral remotely sensed imagery data for earth science observation method of claim 8 wherein the data with spatial characteristics is image data.

12. The computer implemented singleband multispectral remotely sensed imagery data for earth science observation method of claim 8 wherein the determination of the similarity of a pixel or region utilizes a dissimilarity criterion.

13. The computer implemented singleband multispectral remotely sensed imagery data for earth science observation method of claim 8 wherein the dissimilarity criterion is selected from the group of vector norms, the square root of band sum mean squared error, the square root of band maximum squared error, and the SAR Speckle Noise Criterion.

14. A computer implemented singleband multispectral remotely sensed imagery data for earth science observation method of eliminating window artifacts during the processing of a data set of pixels with spatial characteristics, wherein the data set is recursively divided into subsections and segmented into a plurality of regions through a recursive segmentation algorithm using a computer to perform the steps of beginning below a top level of recursion (a) identifying first pixels along boundaries of the subsections at the current level of recursion; (b) designating the identified first pixels that are within a predetermined criteria to a second pixel along an adjacent boundary of another subsection as having a candidate region set including the second pixel's region; (c) setting each identified first pixel with a non-empty candidate region set as a separate region and designating each such region as a contagious region; (d) for each first region computing the dissimilarity of the first region with every other region and if the dissimilarity is less than a threshold value then including such other similar region in a candidate region set for the first region, wherein in computing the dissimilarity of first regions with every other region, spatially adjacent regions are weighted to be similar within a predetermined criteria than equivalent non-adjacent regions: (e) if a first region with a non-empty candidate region set is a contagious region then designating within a predetermined criteria region of that first region's candidate region set as contagious; (f) at a top recursion level, remove all contagious designations from regions; (g) if a first region is not contagious and the most similar region in its candidate region set is not contagious, then merging the first region and most similar candidate region; (h) unless at the top recursion level, returning to step (a) at a higher level of recursion until the number of regions is less than a predetermined number.

15. The computer implemented singleband multispectral remotely sensed imagery data for earth science observation method of claim 14 wherein the recursive segmentation algorithm includes a region growing approach.

16. The computer implemented singleband multispectral remotely sensed imagery data for earth science observation method of claim 14 wherein the recursive segmentation algorithm includes a special clustering approach.

17. The computer implemented singleband multispectral remotely sensed imagery data for earth science observation method of claim 14 wherein the data with spatial characteristics is image data.

18. The computer implemented singleband multispectral remotely sensed imagery data for earth science observation method of claim 14 wherein the determination of the similarity of a pixel or region utilizes a dissimilarity criterion.

19. The computer implemented singleband multispectral remotely sensed imagery data for earth science observation method of claim 18 wherein the dissimilarity criterion is selected from the group of vector norms, the square root of band sum mean squared error, the square root of band maximum squared error, and the SAR Speckle Noise Criterion.

\* \* \* \* \*